US011258863B1

(12) United States Patent
Hochwarth et al.

(10) Patent No.: US 11,258,863 B1
(45) Date of Patent: Feb. 22, 2022

(54) SYSTEMS, DEVICES, AND METHODS FOR ESTABLISHING MULTIPLE ELECTRONIC FLIGHT BAG SESSIONS WITH A FLIGHT MANAGEMENT COMPUTER

(71) Applicant: GE Aviation Systems LLC, Grand Rapids, MI (US)

(72) Inventors: Joachim K. Hochwarth, Caledonia, MI (US); Daniel Devette, Kentwood, MI (US); Victor Mario Leal Herrera, Queretaro (MX); MacKenzie Cumings, Wyoming, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 17/091,598

(22) Filed: Nov. 6, 2020

(51) Int. Cl.
*H04L 29/08* (2006.01)
*H04L 67/146* (2022.01)
*H04L 67/12* (2022.01)

(52) U.S. Cl.
CPC ............ *H04L 67/146* (2013.01); *H04L 67/12* (2013.01)

(58) Field of Classification Search
CPC ....... H04L 67/12; H04L 63/08; H04L 67/141; H04L 67/146; H04L 63/102; H04L 12/66; H04L 2012/4028; H04W 76/10; H04W 4/44; H04W 4/48; B64D 2045/0075; B64D 11/0015
See application file for complete search history.

(56) References Cited

U.S. PATENT DOCUMENTS

| | | | |
|---|---|---|---|
| 6,606,544 B2* | 8/2003 | Glenn, III | G06F 9/451 701/3 |
| 7,606,641 B2 | 10/2009 | Allen | |
| 8,515,658 B1* | 8/2013 | Foster | G01C 23/005 701/456 |
| 8,649,785 B2* | 2/2014 | Durand | H04B 1/3877 455/431 |
| 8,732,233 B2* | 5/2014 | Allen | G08G 5/0013 709/203 |
| 8,782,097 B2 | 7/2014 | Skow | |

(Continued)

OTHER PUBLICATIONS

P. Skaves, "Electronic flight bag (EFB) policy and guidance," 2011 IEEE/AIAA 30th Digital Avionics Systems Conference, 2011, pp. 8D1-1-8D1-11, doi: 10.1109/DASC.2011.6096150. (Year: 2011).*

*Primary Examiner* — David R Lazaro
(74) *Attorney, Agent, or Firm* — Wood IP LLC

(57) ABSTRACT

An onboard system establishes a first-EFB connection between a first electronic flight bag (EFB) and an aircraft interface device (AID), and establishes a first-EFB session between the first EFB and a flight management computer (FMC) based on a session identifier for the first EFB. The first-EFB connection is associated with a first-EFB connection identifier for the first EFB, and the first-EFB session is established over the first-EFB connection in accordance with the first-EFB connection identifier. The onboard system establishes a second-EFB connection between a second EFB and the AID, and establishes a second-EFB session between the second EFB and the FMC based on a session identifier for the second EFB. The second-EFB connection is associated with a second-EFB connection identifier for the second EFB, and the second-EFB session is established over the second-EFB connection in accordance with the second-EFB connection identifier.

20 Claims, 14 Drawing Sheets

(56) References Cited

U.S. PATENT DOCUMENTS

| | | | |
|---|---|---|---|
| 8,935,306 B2* | 1/2015 | Corbefin | G06F 21/572 |
| | | | 707/823 |
| 9,144,094 B2* | 9/2015 | Bhamidipati | H04N 21/43615 |
| 9,167,706 B2* | 10/2015 | Holmstrom | B64D 45/00 |
| 9,335,796 B2* | 5/2016 | Ribich | F16M 13/022 |
| 9,402,182 B1* | 7/2016 | Henzl | H04B 5/0025 |
| 9,567,099 B2 | 2/2017 | Poux et al. | |
| 9,608,976 B2* | 3/2017 | Tamp | B60K 35/00 |
| 9,641,960 B2* | 5/2017 | Verma | H04L 41/0896 |
| 9,646,501 B2 | 5/2017 | Idupunur et al. | |
| 9,652,989 B1 | 5/2017 | Myren et al. | |
| 9,731,815 B2 | 8/2017 | Pangilinan et al. | |
| 9,805,606 B2 | 10/2017 | Coulmeau et al. | |
| 10,045,147 B2* | 8/2018 | Dickow | H04W 68/005 |
| 10,506,092 B1* | 12/2019 | Stephenson | H04W 4/06 |
| 2008/0159158 A1* | 7/2008 | Poisson | B64D 45/00 |
| | | | 370/249 |
| 2010/0105329 A1* | 4/2010 | Durand | H04B 1/3877 |
| | | | 455/41.2 |
| 2011/0270992 A1* | 11/2011 | Judd | G08G 5/0013 |
| | | | 709/227 |
| 2013/0132548 A1* | 5/2013 | Cabos | H04N 21/63 |
| | | | 709/223 |
| 2014/0006631 A1* | 1/2014 | Meskauskas | G01C 21/3614 |
| | | | 709/227 |
| 2014/0120829 A1* | 5/2014 | Bhamidipati | H04N 21/43637 |
| | | | 455/3.06 |
| 2016/0134996 A1* | 5/2016 | Verma | H04L 12/1822 |
| | | | 709/205 |
| 2016/0294707 A1* | 10/2016 | Chen | H04L 67/12 |
| 2016/0352712 A1* | 12/2016 | Tamp | G06F 21/6245 |
| 2017/0208423 A1* | 7/2017 | Dickow | H04W 4/80 |
| 2017/0231016 A1* | 8/2017 | Park | H04W 12/068 |
| 2018/0366008 A1 | 12/2018 | Dacre-Wright et al. | |
| 2019/0031373 A1* | 1/2019 | Sinha | B64F 5/60 |
| 2020/0021481 A1* | 1/2020 | Tsigkogiannis | H04L 67/20 |
| 2020/0301760 A1* | 9/2020 | Janakiraman | G06F 9/54 |

* cited by examiner

600

|        | Connection Identifier | Session Identifier |
|--------|----------------------|--------------------|
| EFB 102 | Identifier 612      | Identifier 622    |
| EFB 104 | Identifier 614      | Identifier 624    |

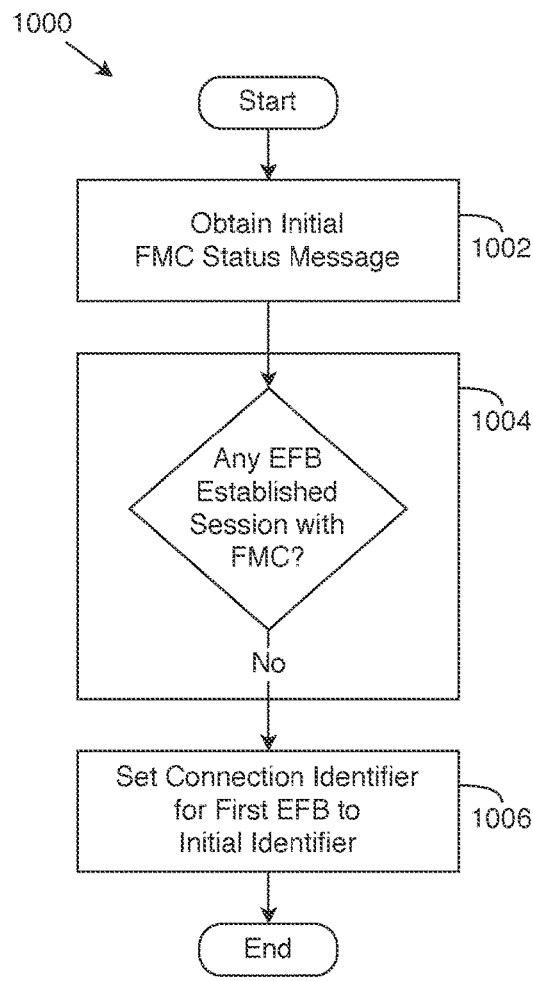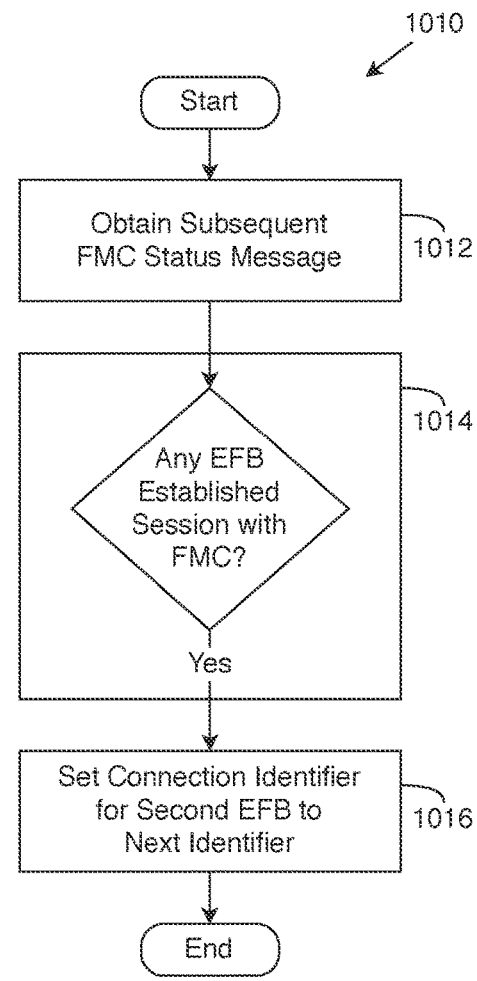
Fig. 10a
Fig. 10b

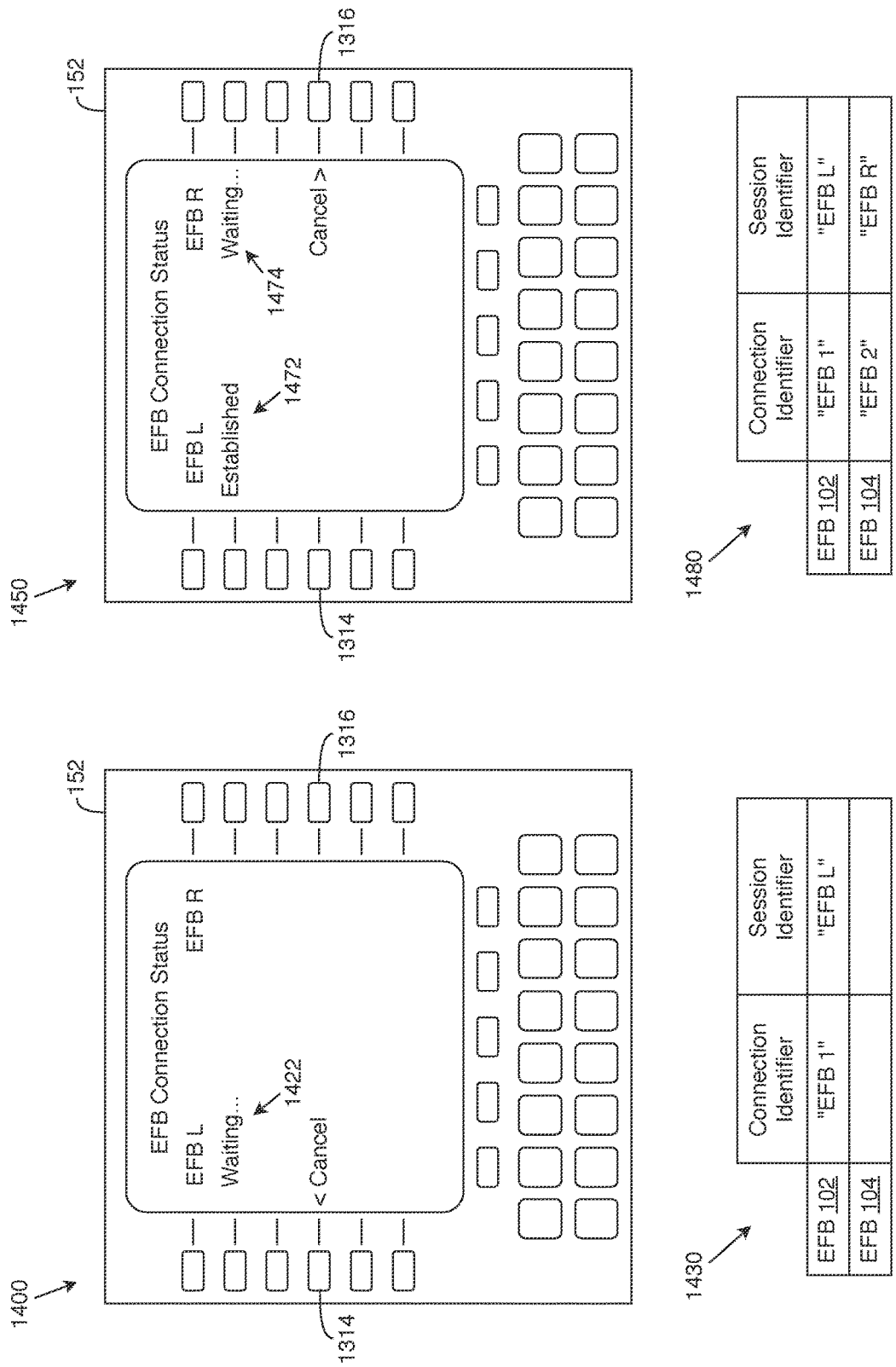

SYSTEMS, DEVICES, AND METHODS FOR ESTABLISHING MULTIPLE ELECTRONIC FLIGHT BAG SESSIONS WITH A FLIGHT MANAGEMENT COMPUTER

FIELD

The present disclosure generally relates to onboard systems, computing devices, and methods carried out by systems and devices, and more specifically, to systems, devices, and methods for establishing multiple Electronic Flight Bag (EFB) sessions with a flight management computer.

BACKGROUND

Modern aircraft are often equipped with a Flight Management Computer (FMC) that automates one or more functions of the aircraft, such as tracking a position of the aircraft, managing a flight plan for the aircraft, and calculating a course of the aircraft. In some instances, aircraft are equipped with multiple FMCs (e.g., for redundancy in the case of a failure of a given FMC. Pilots may interact with a given FMC using a Multi-Function Control and Display Unit (MCDU).

However, a typical MCDU generally provides only rudimentary user interface components for interacting with an FMC. For instance, some MCDUs may include a small monochrome display device and tightly-packed alphanumeric keys, which may limit interaction with the FMC. Other MCDUs may have an improved user interface, though these MCDUs may still lack user interface components that may facilitate richer interaction with the FMC.

SUMMARY

In an embodiment, a method carried out by an onboard system includes establishing a connection between a first EFB and an aircraft interface device (AID). The connection between the first EFB and the AID is associated with a connection identifier for the first EFB. The method further includes setting a session identifier for the first EFB in response to a session request by the first EFB over the connection between the first EFB and the AID, and establishing a session between the first EFB and an FMC based on the session identifier for the first EFB. The session between the first EFB and the FMC is established over the connection between the first EFB and the AID in accordance with the connection identifier for the first EFB. The method also includes establishing a connection between a second EFB and the AID. The connection between the second EFB and the AID is associated with a connection identifier for the second EFB. In addition, the method includes setting a session identifier for the second EFB in response to a session request by the second EFB over the connection between the second EFB and the AID, and establishing a session between the second EFB and the FMC based on the session identifier for the second EFB. The session between the second EFB and the FMC is established over the connection between the second EFB and the AID in accordance with the connection identifier for the second EFB.

In an embodiment, an onboard system includes an FMC, an AID, a first EFB, a second EFB, a processor, and a non-transitory computer-readable storage medium comprising instructions that, when executed by the processor, cause the onboard system to establish a connection between the first EFB and the AID. The connection between the first EFB and the AID is associated with a connection identifier for the first EFB. The instructions further cause the onboard system to set a session identifier for the first EFB in response to a session request by the first EFB over the connection between the first EFB and the AID, and establish a session between the first EFB and the FMC based on the session identifier for the first EFB. The session between the first EFB and the FMC is established over the connection between the first EFB and the AID in accordance with the connection identifier for the first EFB. The instructions also cause the onboard system to establish a connection between a second EFB and the AID. The connection between the second EFB and the AID is associated with a connection identifier for the second EFB. In addition, the instructions cause the onboard system to set a session identifier for the second EFB in response to a session request by the second EFB over the connection between the second EFB and the AID, and establish a session between the second EFB and the FMC based on the session identifier for the second EFB. The session between the second EFB and the FMC is established over the connection between the second EFB and the AID in accordance with the connection identifier for the second EFB.

In an embodiment, a method carried out by an onboard system includes establishing a connection between a first EFB and an AID. The connection between the first EFB and the AID is associated with a connection identifier for the first EFB. The method further includes making a first session determination that no EFB has an established session with the FMC, and in response to making the first session determination, establishing a session between the first EFB and an FMC based on a session identifier for the first EFB. The session between the first EFB and the FMC is established over the connection between the first EFB and the AID in accordance with the connection identifier for the first EFB. The method also includes establishing a connection between a second EFB and the AID. The connection between the second EFB and the AID is associated with a connection identifier for the second EFB. In addition, the method includes making a second session determination that the first EFB has an established session with the FMC, and in response to making the second session determination, establishing a session between the second EFB and the FMC based on a session identifier for the second EFB. The session between the second EFB and the FMC is established over the connection between the second EFB and the AID in accordance with the connection identifier for the second EFB.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 10a depicts a method of establishing a connection between a first EFB and an AID according to one or more embodiments illustrated and described herein;

FIG. 10b depicts a method of establishing a connection between a second EFB and an AID, according to one or more embodiments illustrated and described herein;

FIG. 14a depicts a presentation by a user interface while an FMC is set to a first waiting mode, according to one or more embodiments illustrated and described herein; and FIG. 14b depicts a presentation by a user interface while an FMC is set to a second waiting mode, according to one or more embodiments illustrated and described herein.

DETAILED DESCRIPTION

Traditionally, pilots of commercial aircraft were required to bring "flight bags" for each operated flight. Such flight bags included aircraft operating manuals, flight crew operation manuals, navigational charts, flight checklists, and licensing documents (as just some examples), which were typically in paper form. More recently, pilots have transitioned to "Electronic Flight Bags," which sometimes take the form of tablet computers or laptop computers, and which may store the traditionally paper documents in electronic form. Each pilot may have his or her own EFB.

Aircraft control display units, as described above, often lack the rich user interface components that are provided by modern EFBs. Accordingly, it may be desirable to allow each pilot to interact with the air flight management computer using his or her EFB so as to allow for richer interactions that control display units may be unable to provide.

Onboard systems, computing devices, and methods for establishing multiple EFB sessions with an FMC are disclosed herein. In some embodiments, an onboard system establishes a connection between a first EFB and an AID. The connection between the first EFB and the AID is associated with a connection identifier for the first EFB. The onboard system sets a session identifier for the first EFB in response to a session request by the first EFB over the connection between the first EFB and the AID, and establishes a session between the first EFB and an FMC based on the session identifier for the first EFB. The session between the first EFB and the FMC is established over the connection between the first EFB and the AID in accordance with the connection identifier for the first EFB. In addition, the onboard system establishes a connection between a second EFB and the AID. The connection between the second EFB and the AID is associated with a connection identifier for the second EFB. The onboard system sets a session identifier for the second EFB in response to a session request by the second EFB over the connection between the second EFB and the AID, and establishes a session between the second EFB and the FMC based on the session identifier for the second EFB. The session between the second EFB and the FMC is established over the connection between the second EFB and the AID in accordance with the connection identifier for the second EFB. Because the connections between the EFBs and the AID are associated with respective connection identifiers for the EFBs, and because the sessions between the EFBs and the FMC are established over the respective connections in accordance with the connection identifiers, it may be possible for the FMC to distinguish between the EFBs and to allow each pilot to use his or her own EFB to interact with the FMC. Various embodiments of onboard systems, computing devices, and methods for establishing multiple EFB sessions with an FMC will now be described in detail with reference to the drawings.

Figure 1:
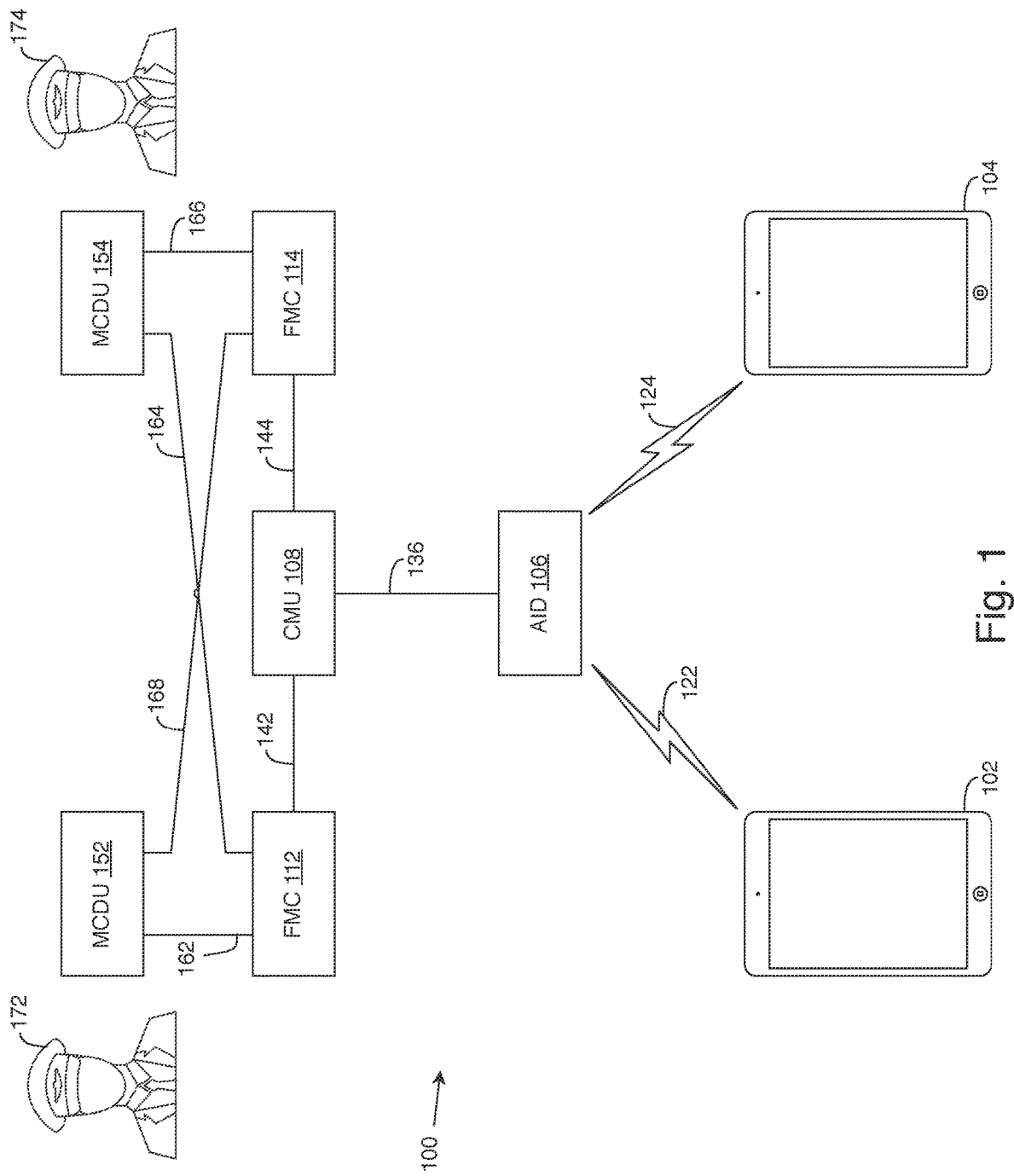
FIG. 1 depicts an onboard system of an aircraft, according to one or more embodiments illustrated and described herein.

FIG. 1 depicts an onboard system of an aircraft, according to one or more embodiments illustrated and described herein. As shown, a system 100 includes an EFB 102, an EFB 104, an AID 106, a Communications Management Unit (CMU) 108, an FMC 112, and an FMC 114. In some embodiments, AID 106, CMU 108, FMC 112, and FMC 114 are fixed installations of the aircraft, while EFB 102 and EFB 104 removable from the aircraft by a crew member or other individual (i.e., the EFBs are not fixed to the aircraft).

In some embodiments, AID 106 is communicatively coupled to EFB 102 and EFB 104, and is further communicatively coupled to CMU 108. In turn, CMU 108 is communicatively coupled to FMC 112 and FMC 114 (in addition to AID 106). As such, AID 106 and CMU 108 may collectively facilitate communication between the EFBs and the FMCs (e.g., between a given EFB and the FMCs). For example, in the embodiment illustrated in FIG. 1, AID 106 is communicatively coupled to EFB 102 and EFB 104 via a communication link 122 and a communication link 124, respectively. In addition, AID 106 is communicatively coupled to CMU 108 via a communication link 136, and CMU 108 is communicatively coupled to FMC 112 and FMC 114 via a communication link 142 and a communication link 144, respectively. It will be appreciated that system 100 may include different and/or additional communication links. For instance, FMC 112 and FMC 114 may be communicatively coupled to AID 106 via respective communication links.

EFB 102 could be a tablet computer, a laptop computer, a portable (e.g., mobile) computing device or other computing device, or any other EFB configured to carry out the EFB functions described herein. EFB 102 may provide functionality such as digital documentation for the aircraft, digital charts and procedures, and/or airport surface moving maps, among other examples described herein. EFB 102 could take other forms as well, and EFB 104 could take a form similar to EFB 102, among other possibilities.

FMC 112 may form or be a part of a Flight Management System (FMS) that automates one or more functions of the aircraft, such as tracking a position of the aircraft, managing a flight plan for the aircraft, and calculating a course of the aircraft, as just a few examples. FMC 112 may collect data from one or more sensors of the aircraft, such as a Global Positioning System (GPS) sensor, an accelerometer, a gyroscope, a barometric altimeter, and a magnetometer, among other possibilities. As another example, FMC 112 may collect data from an Inertial Navigation System (INS) or other system of the aircraft. User input to and output from FMC 112 may be achieved through a CDU, which may include a touchscreen or other display device, a keyboard, or a combination of these or other user interface components, among other possibilities. FMC 112 could take various other forms as well without departing from the scope of the present disclosure, and FMC 114 could take a form similar to FMC 112.

In some embodiments, EFB 102 is outside of a domain (or combination of domains) that includes FMC 112 and FMC 114. For instance, in system 100, a subsystem may be designated a given domain based on, e.g., a function performed by the given subsystem. Other subsystems could be designated to the domain—for example, if the subsystems perform functions similar to the other subsystems in the domain, or if the subsystems require communication with other subsystems in the domain. CMU 108, FMC 112, and FMC 114 could form (or be part of) one such domain. Communications into and out of a given domain (e.g., communication between different domains) may be restricted. Accordingly, direct communication with CMU 108, FMC 112, and/or FMC 114 may be partially or completely restricted for EFB 102 and EFB 104.

AID 106 may facilitate communication between EFB 102 and one or more of CMU 108, FMC 112, and FMC 114. For instance, some or all communication may be authorized between AID 106 and one or more of CMU 108, FMC 112, and FMC 114, even if AID 106 is not in the same domain as these other subsystems. Accordingly, AID 106 may function as an intermediary, or otherwise facilitate communication with CMU 108, FMC 112, and/or FMC 114 on behalf of EFB 102, even though EFB 102 may be restricted from direct communication with these subsystems. As another possibility, AID 106 may translate communication between EFB 102 and one or more of CMU 108, FMC 112, and FMC 114. For instance, CMU 108 (or another subsystem) may communicate with other entities according to a protocol such as Aeronautical Radio. Inc. (ARINC) 429, also known as the Mark 33 Digital Information Transfer System (DITS). EFB 102, on the other hand, may communicate according to another protocol or combination of protocols, such as Internet Protocol (IP), Transmission Control Protocol (TCP), User Datagram Protocol (UDP), and Hypertext Transfer Protocol (HTTP), among other possibilities. AID 106 may function to convert ARINC 429 communication to IP communication (or communication of another protocol), and vice versa. It should be appreciated that AID 106 may take other forms as well (such as a network gateway) and that AID 106 may facilitate communication between EFB 102 and one or more other entities of system 100 (such as an ARINC 664 network and/or an Avionics Full-Duplex Switched Ethernet (AFDX) network). AID 106 may similarly facilitate communication between EFB 104 and one or more of entities of system 100 such as CMU 108, FMC 112, and FMC 114 (as examples).

CMU 108 may operate to route communication between entities of system 100, such as communication between any one or more of CMU 108, FMC 112, and FMC 114. In addition, the CMU may facilitate communication between system 100 (e.g., entities of the onboard system) and one or more ground stations. For instance, CMU 108 may route communication between system 100 and Air Traffic Control (ATC) and/or between system 100 and an Airline Operations Center (AOC), as examples. Such communication could include aircraft avionics data, among other possibilities.

System 100 may further include an MCDU 152 and an MCDU 154, which may function as user interfaces of FMC 112 for pilots of the aircraft that includes system 100 (as just one example). For instance, as illustrated in FIG. 1, MCDU 152 may function as a user interface for a pilot 172, and MCDU 154 may function as a user interface for a pilot 174. MCDU 152 is communicatively coupled to FMC 112 and FMC 114 via a communication link 162 and a communication link 168, respectively, and MCDU 154 is communicatively coupled to FMC 112 and FMC 114 via a communication link 164 and a communication link 166, respectively. In some embodiments, MCDU 152 includes a display device such as a Liquid Crystal Display (LCD) display device or a Cathode Ray Tube (CRT) display device, as examples. MCDU 152 could include one or more alphanumeric keys and/or could include one or more soft keys at the sides of the display device (e.g., to navigate a menu or make selections), among numerous other possibilities. MCDU 154 may take a form similar to MCDU 152. It will be appreciated that an MCDU may be referred to by different names, such as a Control Display Unit (CDU) or a cockpit display system (ARINC 661) among numerous other examples, and that MCDU 152 and MCDU 154 are intended to encompass the user interfaces by these various names.

Communication links 122, 124, 136, 142, 144, and 162 to 168 may take the form of one or more wired and/or wireless communication links. Any of the communication links may be a combination of hardware and/or software, perhaps in one or more communication layers such as one or more link, network, and/or session layers. Also, the communication links may include one or more intermediate paths or systems. Additional aspects with respect to communication links between entities of system 100 are described below.

In some embodiments, FMC 112 initially functions as a primary FMC, and system 100 includes one or more additional FMCs that function as respective failover FMCs with respect to FMC 112. The one or more additional FMCs may take forms similar to FMC 112, among other possibilities. In the event of a failure of FMC 112 while functioning as the primary FMC, one or more of the additional FMCs may begin functioning as the primary FMC, and FMC 112 may cease functioning as the primary FMC. Other examples are possible as well.

It should be understood that system 100 may include different and/or additional components. For example, system 100 could include additional or fewer EFBs, FMCs, and/or communication links, among other possibilities. One or more components of system 100 could be combined into a single component, and similarly, the functions of a given component described herein could be carried out by multiple components. Other variations are possible as well.

While the components of system 100 are described as components within an aircraft, the present disclosure is not limited to such. That is, system 100 and/or any combination of components of the onboard system may be incorporated into various other types of craft, and may function in a similar manner within the craft. For example, system 100 (or any components thereof) may be present in watercraft, spacecraft, and/or the like without departing from the scope of the present disclosure.

Figure 2:
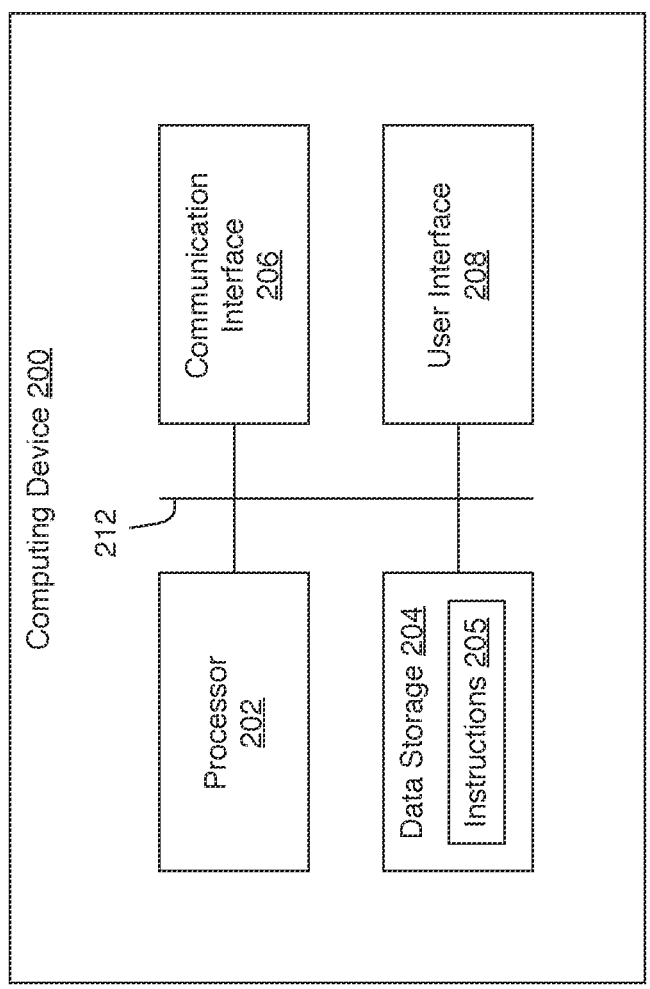
FIG. 2 depicts a block diagram of a computing device, according to one or more embodiments illustrated and described herein.

FIG. 2 depicts a block diagram of a computing device, according to one or more embodiments illustrated and described herein. As shown, a device 200 includes a processor 202, a data storage 204 including instructions 205, a communication interface 206, and a user interface 208, each of which are communicatively coupled via a system bus 212. Any of EFB 102, EFB 104, AID 106, CMU 108, FMC 112, FMC 114, MCDU 152, and MCDU 154, or any other entity of system 100, may take the form of (or a form similar to) device 200.

Processor 202 may take the form of one or more general-purpose processors and/or one or more special-purpose processors, and may be integrated in whole or in part with data storage 204, communication interface 206, user interface 208, and/or any other component of device 200, as examples. Accordingly, processor 202 may take the form of or include a controller, an integrated circuit, a microchip, a Central Processing Unit (CPU), a microprocessor, a System on a Chip (SoC), a Field-Programmable Gate Array (FPGA), and/or an Application-Specific Integrated Circuit (ASIC), among other possibilities.

Data storage 204 may take the form of a non-transitory computer-readable storage medium such as a hard drive, a solid-state drive, an Erasable Programmable Read-Only Memory (EPROM), a USB storage device, a Compact Disc Read-Only Memory (CD-ROM) disk, a Digital Versatile Disc (DVD), a Relational Database Management System (RDBMS), any other non-volatile storage, or any combination of these, to name just a few examples.

Instructions 205 may be stored in data storage 204, and may include machine-language instructions executable by processor 202 to cause device 200 to perform the computing-device functions described herein, such as the respective functions of one or more entities of system 100. Additionally or alternatively, instructions 205 may include script instructions executable by a script interpreter configured to cause processor 202 and device 200 to execute the instructions specified in the script instructions. It should be understood that instructions 205 may take other forms as well.

Communication interface 206 may be any component capable of performing the communication interface functions described herein, including facilitating wired and/or wireless communication between device 200 and another entity of system 100. As such, communication interface 206 could take the form of an Ethernet, Wi-Fi, Bluetooth, USB, and/or ARINC 429 interface, among many other examples, and may send and/or receive data via the communication links described herein, for instance.

User interface 208 may be any component capable of carrying out the user interface functions described herein. For example, the user interface may be configured to receive input from a user and/or output information to the user. Output may be provided via a touchscreen display or other display device, a loudspeaker (such as a tablet speaker), or another component of (or communicatively linked to) device 200. User input might be achieved via the touchscreen display, a keyboard, a mouse, or other component of (or communicatively linked to) the EFB. Some components may provide for both input and output, such as the aforementioned touchscreen display. User interface 208 may take numerous other forms as well.

System bus 212 may be any component capable of performing the system bus functions described herein. In an embodiment, system bus 212 is any component configured to transfer data between processor 202, data storage 204, communication interface 206, user interface 208, and/or any other component of device 200. System bus 212 could include a traditional bus as is known in the art. In other embodiments, system bus 212 could include one or more of the communication links described herein, alone or in combination with a traditional computer bus, among numerous other possibilities. In some examples, system bus 212 may be formed from any medium that is capable of transmitting a signal, such as conductive wires, conductive traces, or optical waveguides, among other possibilities. Moreover, system bus 212 may be formed from a combination of mediums capable of transmitting signals. It will be appreciated that system bus 212 may take various other forms as well.

It should be understood that device 200 may include different and/or additional components, and some or all of the functions of a given component could instead be carried out by one or more different components. For example, in some embodiments, device 200 includes an additional communication interface, and in some embodiments, device 200 does not include user interface 208. Other examples are possible as well without departing from the scope of the disclosure.

Figure 3:
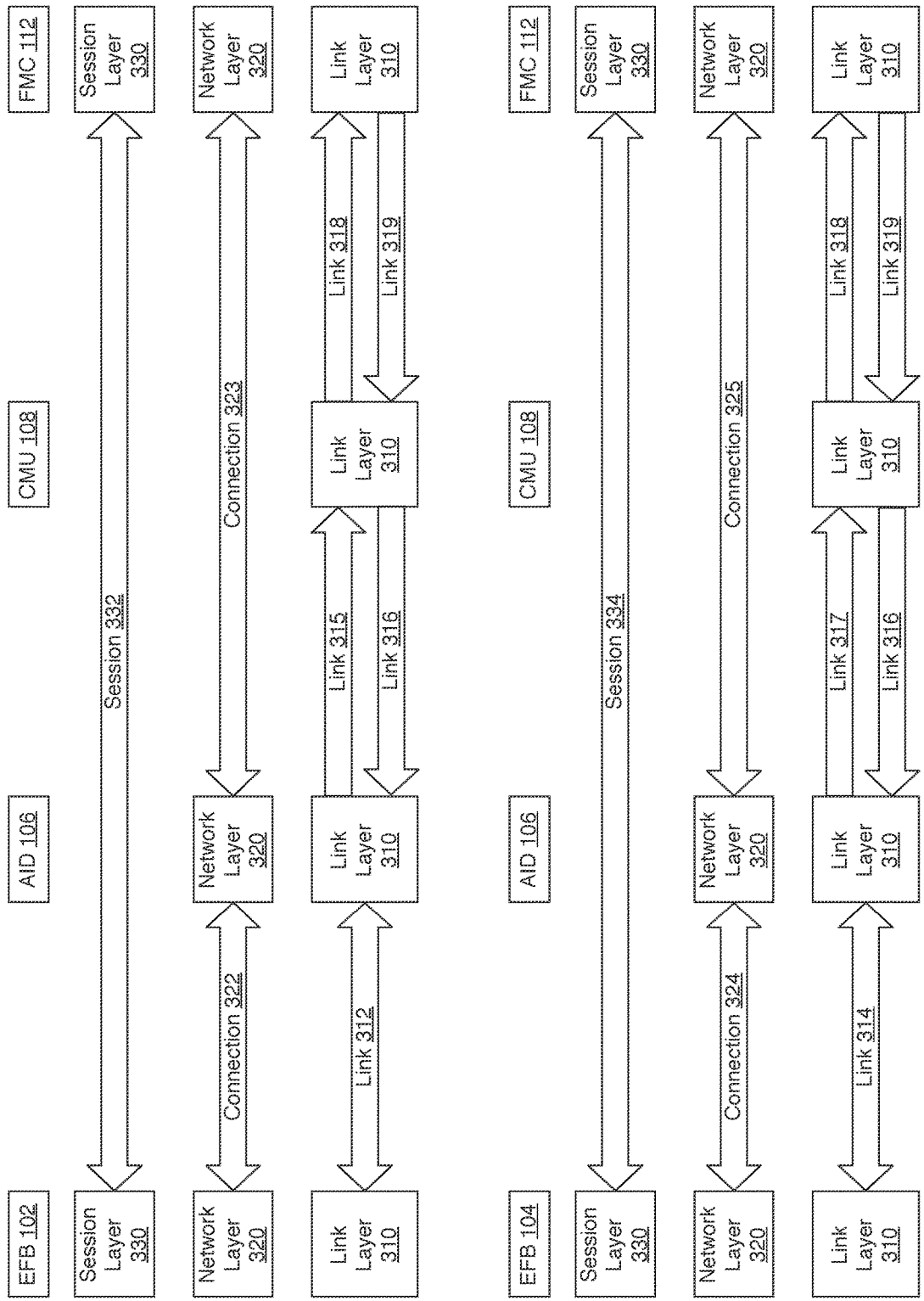
FIG. 3 depicts communication layers of an onboard system, according to one or more embodiments illustrated and described herein.

FIG. 3 depicts communication layers of an onboard system, according to one or more embodiments illustrated and described herein. As shown, communication layers of system 100 include a link layer 310, a network layer 320, and a session layer 330. Link layer 310 includes a communication link 312, a communication link 314, a communication link 315, a communication link 316, a communication link 317, a communication link 318, and a communication link 319. In addition, network layer 320 includes a connection 322, a connection 323, a connection 324, and a connection 325, and session layer 330 includes a session 332 and a session 334.

Link layer 310 could take the form of a physical layer according to the Open Systems Interconnection (OSI) model, a data link layer according to the OSI model, or a combination of these, as just a few examples. As another possibility, link layer 310 could take the form of a link layer according to the Internet Protocol suite. The communication links in link layer 310, the communication conveyed via these communication links, or both may conform to one or more protocols. For instance, a given communication link in link layer 310 could include a physical layer and a data link layer as defined by a given IEEE 802.11 (Wi-Fi) standard, and communication via the communication link (e.g., frames conveyed over an air interface) could conform to the 802.11 standard. In an embodiment, each respective communication link in link layer 310 facilitates communication between the entities that are communicatively coupled by communication link without an intervening router, though it will be appreciated that one or more of the communication links in link layer 310 could facilitate communication via one or more other entities of system 100.

The communication links in link layer 310 may take the form of bidirectional communication links, unidirectional communication links, or a combination of these, as examples. A given bidirectional communication link may facilitate bidirectional communication between the entities communicatively coupled by the bidirectional communication link, while a given unidirectional link from a given entity to another entity may facilitate communication from the given entity to the other entity. A pair of unidirectional communication links may allow for bidirectional communication between entities by facilitating communication in respectively opposing directions. Any of the communication links in link layer 310 could take the form of multiple communication links.

In the embodiment of FIG. 3, communication link 312 takes the form of a bidirectional communication link between EFB 102 and AID 106, and communication link 314 takes the form of a bidirectional communication link between EFB 104 and AID 106. Also, communication link 315 and communication link 317 take the form of respective unidirectional communication links from AID 106 to CMU 108, and communication link 316 takes the form of a unidirectional communication link from CMU 108 to AID 106. In addition, communication link 318 takes the form of a unidirectional communication link from CMU 108 to FMC 112, and communication link 319 takes the form of a unidirectional communication link from FMC 112 to CMU 108. With reference to FIG. 1, communication link 122 and communication link 124 could take the form of (or include) communication link 312 and communication link 314, respectively. In addition, communication link 136 could take the form of (or include) communication links 315, 316, and 317, and communication link 142 could take the form of (or include) communication links 318 and 319.

In some embodiments, one or more of the unidirectional communication links in link layer 310 take the form of respective ARINC 429 data buses. Each ARINC 429 data bus in turn may take the form of a single source, multi sink data bus configured to convey information in the form of respective messages that conform to the ARINC 429 protocol. The messages may include a source identifier component, a data component, a label component (e.g., identifying the content type in the data component), a status component, or any combination of these or other components, and the messages could take the form of respective 32-bit words as defined by the ARINC 429 protocol, among other possibilities.

Figure 4:
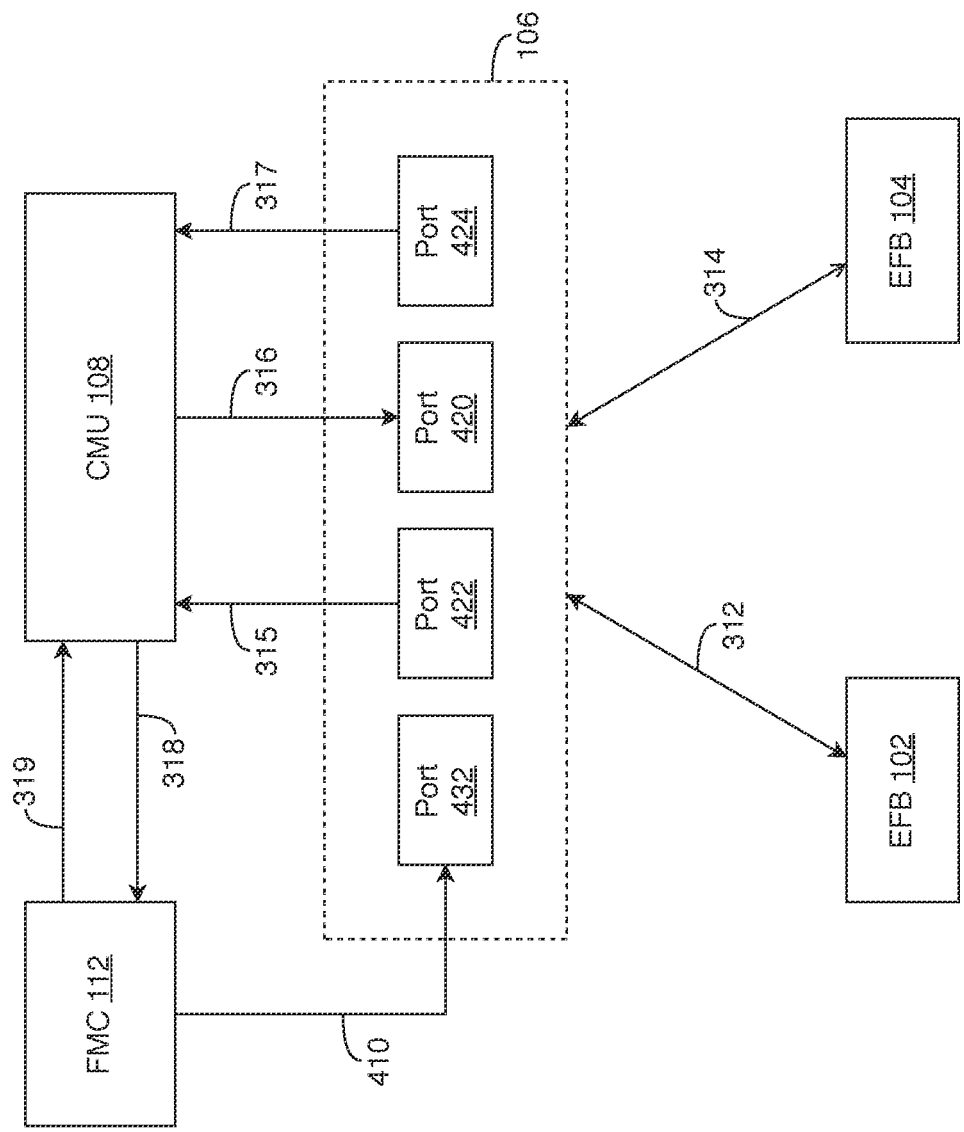
FIG. 4 depict communication links in a link layer of an onboard system, according to one or more embodiments illustrated and described herein.

FIG. 4 depicts communication links 312 and 314-319 that are in link layer 310, according to one or more embodiments illustrated and described herein. In the embodiment of FIG. 4, AID 106 includes a port 422 and a port 424, and communication links 315 and 317 take the form of respective ARINC 429 data buses from ports 422 and 424 to CMU 108, respectively. AID 106 further includes a port 420 and a port 432. Communication link 316 takes the form of an ARINC 429 data bus from CMU 108 to port 420, and a communication link 410 takes the form of an ARINC 429 data bus from FMC 112 to port 432.

In an embodiment, communication link 312 (between EFB 102 and AID 106) conforms to a first link-layer protocol, and one or more of communication links 315, 316, 318, and 319 conform to a second link-layer protocol different from the first link-layer protocol. For instance, communication link 312 could conform to an IEEE 802 protocol such as IEEE 802.3 (Ethernet) and/or IEEE 802.11 (Wi-Fi), and communication links 315, 316, 318, and/or 319 could conform to the ARINC 429 protocol, as just one possibility. In another embodiment, communication link 314 (between EFB 104 and AID 106) conforms to a first link-layer protocol (e.g., an IEEE 802 protocol), and one or more of communication links 316, 317, 318, and 319 conform to a second link-layer protocol (e.g., the ARINC 429 protocol).

With reference again to FIG. 3, network layer 320 could take the form of a higher communication layer with respect to link layer 310, such as a transport and/or Internet layer according to the Internet Protocol suite, and connections within network layer 320 may facilitate communication between the entities communicatively coupled by the respective connections. The connections in network layer 320, the communication conveyed via these connections, or both may conform to one or more protocols. As one possibility, communication via a given connection in network layer 320 could take the form of one or more IP packets in an Internet layer according to the Internet Protocol. As another possibility, a given connection in network layer 320 could take the form of a TCP connection in a transport layer according to the Transmission Control Protocol. In the embodiment of FIG. 3, connection 322 takes the form of a connection between EFB 102 and AID 106, and connection 324 takes the form of a connection between EFB 104 and AID 106. In addition, connection 323 and connection 325 take the form of respective connections between AID 106 and FMC 112. It should be appreciated that different and/or additional connections could be present in network layer 320. As an example, connection 323 could take the form of (or include) two connections: a connection between AID 106 and CMU 108, and another connection between CMU 108 and FMC 112. Connection 325 could likewise take the form of two connections. As another example, connection 323 and connection 325 could be the same connection or could take the form of respectively different connections. Other examples are possible as well.

Figure 5:
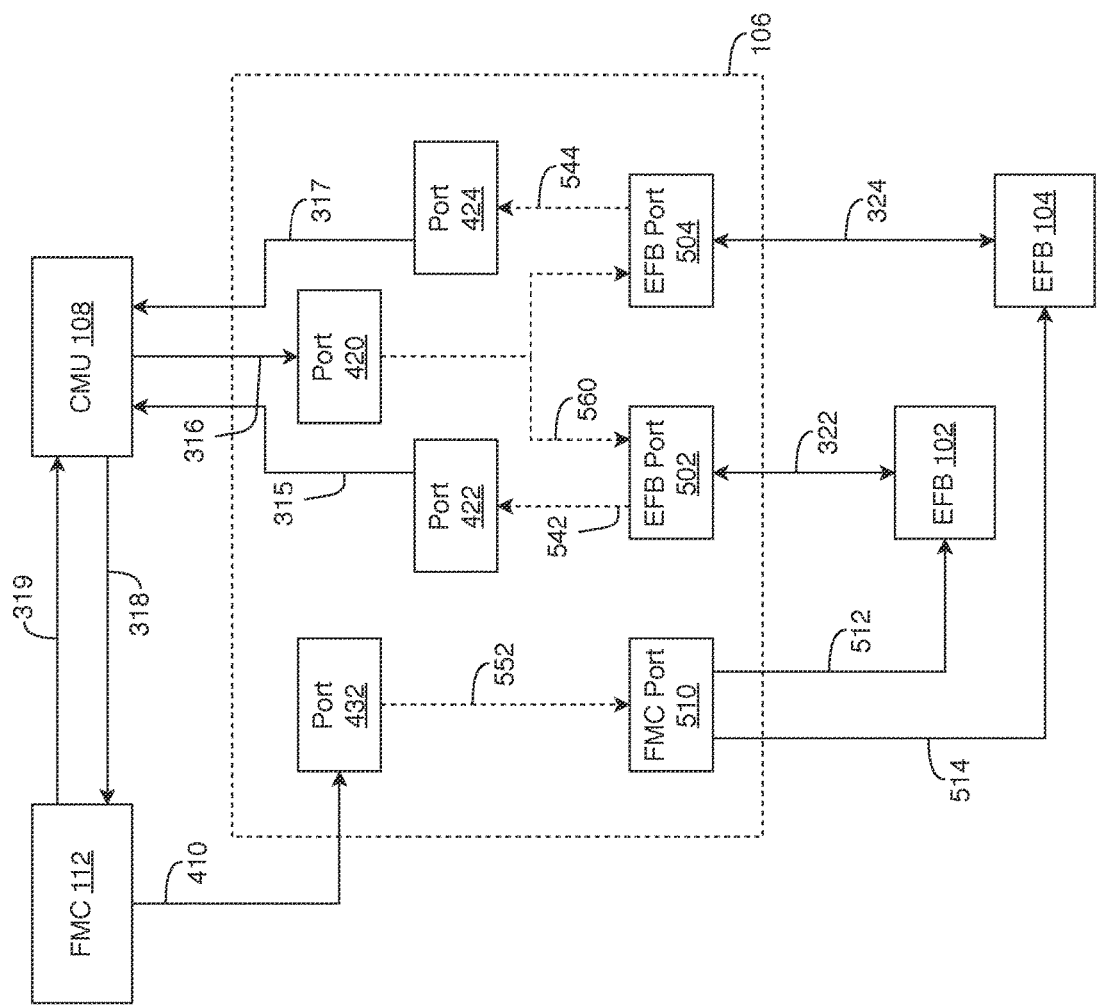
FIG. 5 depict connections in a network layer of an onboard system, according to one or more embodiments illustrated and described herein.

FIG. 5 depicts connections 322 and 324 that are in network layer 320, according to one or more embodiments illustrated and described herein. As shown, AID 106 includes ports 420, 422, 424, and 432 described above with reference to FIG. 4. In the embodiment of FIG. 5, AID 106 further includes an EFB port 502, an EFB port 504, and an FMC port 510. Connection 322 takes the form of a connection between EFB 102 and EFB port 502, and connection 324 takes the form of a connection between EFB 104 and EFB port 504. In addition, FMC port 510 is communicatively coupled to EFB 102 and EFB 104 via a communication link 512 and a communication link 514, respectively. In an embodiment, system 100 includes additional FMCs, and in one such embodiment, AID 106 includes a respective FMC port for each of the FMCs of system 100.

EFB ports 502 and 504 could take the form of respective ports in network layer 320, such as respective TCP ports according to the Transmission Control Protocol, among many other possibilities. FMC port 510 could similarly take the form of a port in network layer 320, or could take the form of a port in a communication layer different from (or in addition to) the communication layer that includes EFB ports 502 and 504 (i.e., network layer 320). As such, communication links 512 and 514 may take the form of (or include) respective communication links in link layer 310, respective connections in network layer 320, respective communicative couplings in one or more different communication layers, or a combination of these, as examples. For instance, in an embodiment, communication links 512 and 514, like connections 322 and 324, take the form of respective connections in network layer 320. As another possibility, communication links 512 and 514, like communication links 312 and 314, may take the form of respective communication links in link layer 310. Numerous other examples are possible as well. In some embodiments, communication link 512 takes the form of a unidirectional communication link from FMC port 510 to EFB 102, and communication link 514 takes the form of a unidirectional communication link from FMC port 510 to EFB 104.

In the embodiment of FIG. 5, EFB port 502 is communicatively coupled to port 422 via a communication link 542, EFB port 504 is communicatively coupled to port 424 via a communication link 544, and port 432 is communicatively coupled to FMC port 510 via a communication link 552. EFB port 502 may be associated with port 422, communication link 315, and/or communication link 542, and EFB port 504 may be associated with port 424, communication link 317, and/or communication link 544, as will be described in additional detail below. In addition, port 420 is communicatively coupled to EFB port 502 and EFB port 504 via a communication link 560. In an embodiment, communication links 542-560 take the form of unidirectional communication links as shown in FIG. 5, though any one or more (or all) of communication links 542-560 could instead take the form of bidirectional communication links. Moreover, communication links 542-560 may take the form of (or include) communication links in link layer 310, connections in network layer 320, communicative couplings in a different communication layer (e.g., session layer 330 and/or application layer), or a combination of these, as examples. Those of skill in the art will appreciate that additional, different, and/or fewer communication links may be present. For example, communication link 560 could take the form of a first communication link from port 420 to EFB port 502 and a second communication link from port 420 to EFB port 504.

In an embodiment, connection 322 (between EFB 102 and AID 106) conforms to a first network-layer protocol, and connection 323 (between AID 106 and FMC 112) conforms to a second network-layer protocol different from the first network-layer protocol. For instance, connection 322 could conform to the Transmission Control Protocol and connection 323 could conform to the ARINC 619 protocol. In another embodiment, connection 324 (between EFB 104 and AID 106) conforms to a first network-layer protocol (e.g., the Transmission Control Protocol), and connection 325 (between AID 106 and FMC 112) conforms to a second network-layer protocol (e.g., the ARINC 619 protocol) different from the first network-layer protocol. Other variations are possible as well without departing from the scope of the disclosure.

In some embodiments, connection 322 conforms to a first network-layer protocol, connection 323 conforms to a second network-layer protocol, and communication conveyed over connection 322 encapsulates communication that conforms to the second network-layer protocol. As an example, connection 322 could conform to the Transmission Control Protocol and connection 323 could conform to the ARINC 619 protocol as described above, and TCP communication over connection 322 could encapsulate ARINC 619 communication. In this example, TCP communication received by AID 106 over connection 322 is de-encapsulated into the ARINC 619 communication, which could then be forwarded over connection 323 (e.g., based on a source and/or destination identifier in the ARINC 619 communication) and/or routed by CMU 108 (e.g., based on the source and/or destination identifiers). In addition, ARINC 619 communication received by AID 106 over connection 323 could be encapsulated within TCP communication that could then be sent over connection 322. Other examples are possible as well. In some embodiments, connection 324 conforms to a first network-layer protocol, connection 325 conforms to a second network-layer protocol, and communication conveyed over connection 324 encapsulates communication that conforms to the second network-layer protocol.

Referring again to FIG. 3, session layer 330 could take the form of a higher communication layer with respect to link layer 310 and network layer 320, such as a session or application layer according to the OSI model, an application layer according to the Internet Protocol suite, or a combination of these, as examples. Sessions within session layer 330 may facilitate communication between the entities communicatively coupled by the respective sessions, and the sessions and/or communication conveyed via the sessions may conform to one or more protocols. In the embodiment of FIG. 3, session 332 takes the form of a session between EFB 102 and FMC 112, and session 334 takes the form of a session between EFB 104 and FMC 112.

It will be appreciated that system 100 may include different and/or additional communication layers other than the link layer 310, network layer 320, and session layer 330 depicted in FIG. 3. In addition, the respective communication layers of system 100 may include different communication links, connections, and/or sessions. One or more communication layers of system 100 could be combined into a single communication layer, and a given communication layer could instead take the form of multiple communication layers. Other examples are possible as well without departing from the scope of the disclosure.

Figures 6A, 6B:
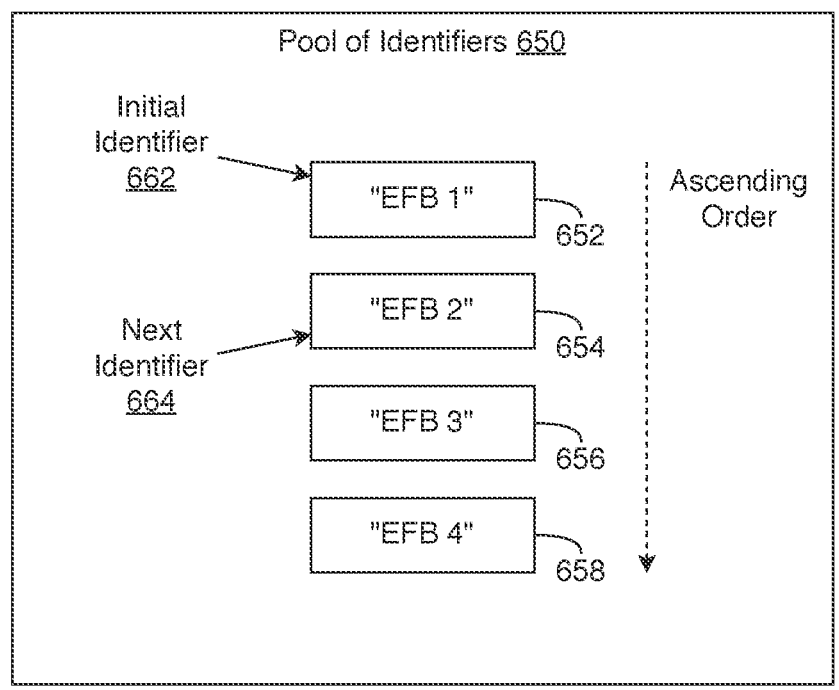
FIG. 6a depicts identifiers for EFBs of an onboard system, according to one or more embodiments illustrated and described herein.
FIG. 6b depicts a pool of identifiers for an onboard system, according to one or more embodiments illustrated and described herein.

FIG. 6a depicts identifiers for EFB 102 and EFB 104, according to one or more embodiments illustrated and described herein. As shown, the identifiers include a connection identifier 612 for EFB 102, a session identifier 622 for EFB 102, a connection identifier 614 for EFB 104, and a session identifier 624 for EFB 104. In an embodiment, connection 322 is associated with connection identifier 612 and connection 324 is associated with connection identifier 614. In some embodiments, connection identifier 612 includes an identifier associated with EFB port 502 and connection identifier 614 includes an identifier associated with EFB port 504. In addition, session identifier 622 may be associated with MCDU 152 and session identifier 624 may be associated with MCDU 154. Other examples are possible as well, and additional details regarding the connection identifiers and session identifiers are provided below.

FIG. 6b depicts a pool of identifiers for an onboard system, according to one or more embodiments illustrated and described herein. As shown, a pool of identifiers 650 includes an identifier 652, an identifier 654, an identifier 656, and an identifier 658, which may have values of "EFB 1," "EFB 2," "EFB 3," and "EFB 4," respectively (as examples). In some embodiments, identifier 652 takes the form of an initial identifier 662 and identifier 654 takes the form of a next identifier 664 (with respect to initial identifier 662).

In an embodiment, pool of identifiers 650 takes the form of an ordered set of identifiers, and initial identifier 662 takes the form of, for instance, a lowest-value identifier in the ordered set of identifiers. As an example, the identifiers in pool of identifiers 650 may be an ordered set of identifiers in ascending order from identifier 652 to identifier 658, as illustrated in FIG. 6b. In such an example, next identifier 664 may take the form of, for instance, a next-lowest-value identifier with respect to the lowest-value identifier in the ordered set of identifiers. It should be appreciated that pool of identifiers 650 and/or the ordered set of identifiers could take other forms as well, and that the identifiers in the pool or ordered set need not be contiguous identifiers.

In one such embodiment, the ordered set of identifiers takes the form of a set of numerical identifiers ranging from one to four, the lowest-value identifier being one. In another such embodiment, the ordered set of identifiers takes the form of alphabetical identifiers ranging from A to D, the lowest-value identifier being A. In an additional embodiment, the ordered set of identifiers takes the form of IP addresses 10.0.0.1 through 10.0.0.4, the lowest-value identifier being IP address 10.0.0.1. In some embodiments, the respective data storages of EFB 102 and EFB 104 include data that indicates the ordered set of identifiers (e.g., data indicating the range of identifiers). It will be appreciated that the identifiers in pool of identifiers 650 may take other forms as well, and the pool of identifiers need not be contiguous identifiers. Moreover, the above-mentioned ranges could have additional identifiers and/or fewer identifiers.

It should be understood that identifier table 600 (and the identifier tables discussed in subsequent figures) need not take the form of a discrete table stored at any one entity of system 100. Rather, identifier table 600 is provided for ease of understanding the connection identifiers and session identifiers, and it will be appreciated that any one or more of the connection identifiers and session identifiers may be stored in any combination of entities of system 100. Similarly, pool of identifiers 650 need not take the form of a discrete table or other data stored at any one entity of system 100.

Figure 7:
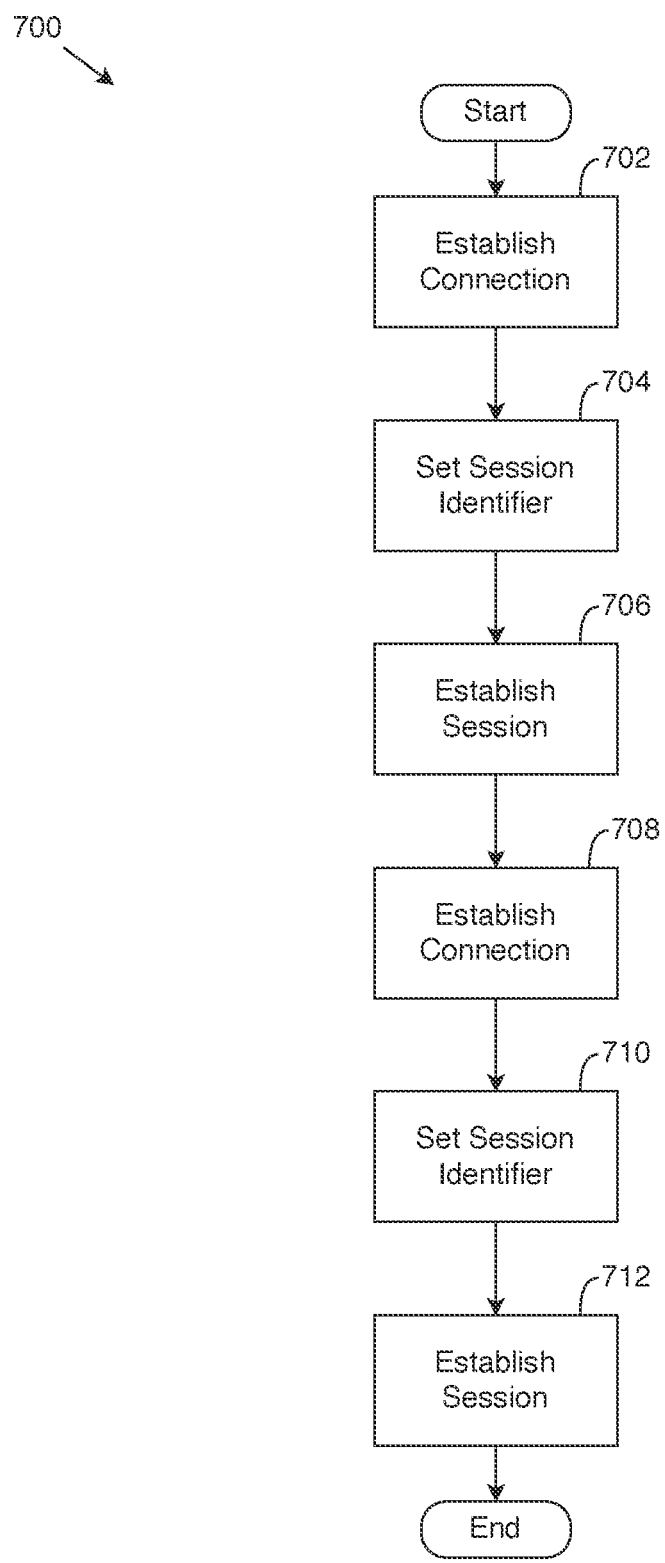
FIG. 7 depicts a flowchart of a method carried out by an onboard system, according to one or more embodiments illustrated and described herein.

FIG. 7 depicts a flowchart of a method carried out by an onboard system, according to one or more embodiments illustrated and described herein. Though the method is described below as being carried out by system 100, it should be understood that the method may be carried out by any entity or combination of entities of system 100.

As shown in FIG. 7, a method 700 begins at step 702 with system 100 establishing connection 322 between EFB 102 and AID 106. In the embodiment of FIG. 7, connection 322 between EFB 102 and AID 106 is associated with connection identifier 612 for EFB 102. As will be discussed in additional detail with respect to subsequent steps of method 700, session 332 between EFB 102 and FMC 112 is established over connection 322 between EFB 102 and AID 106 in accordance with connection identifier 612. Establishing connection 322 at step 702 may include system 100 carrying out the steps of one or more of the methods described below with reference to FIG. 8a and/or FIG. 10a, as just a couple of examples.

Figure 8A:
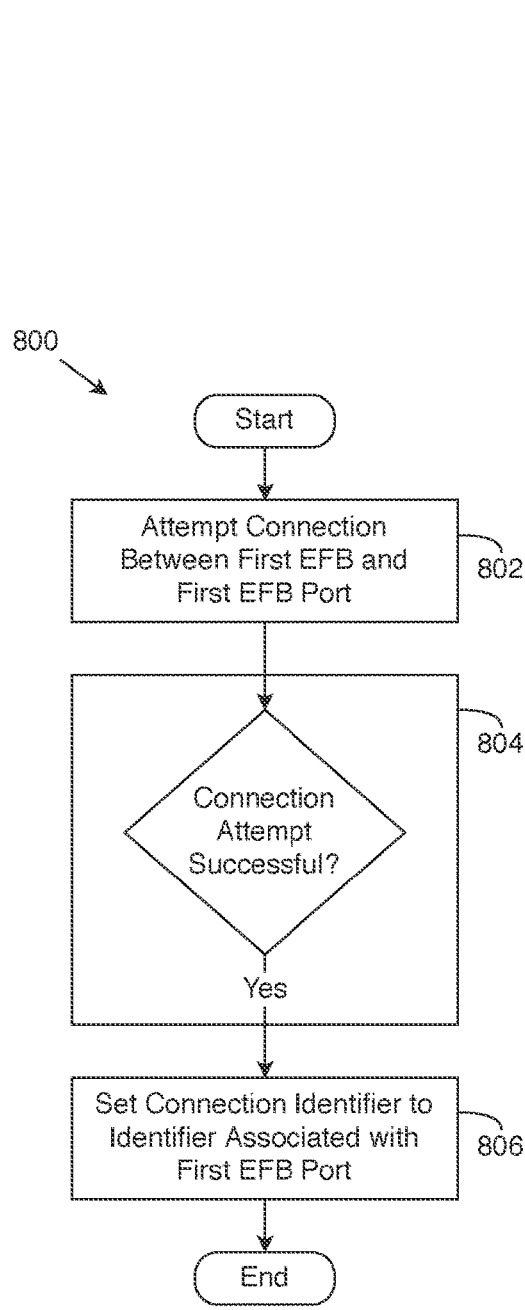
FIG. 8a depicts a method of setting a connection identifier for a first EFB, according to one or more embodiments illustrated and described herein.

Specifically, FIG. 8a depicts a method of setting connection identifier 612 for EFB 102, according to one or more embodiments illustrated and described herein. As shown, a method 800 begins at step 802 with system 100 performing a first-EFB connection attempt to establish a connection between EFB 102 and EFB port 502 of AID 106. The method continues at step 804 with system 100 making a first-EFB connection determination that the first-EFB connection attempt was successful. At step 806 and in response to making the first-EFB connection determination, system 100 sets connection identifier 612 to an identifier associated with EFB port 502. In such an embodiment, the connection identifier with which connection 322 is associated takes the form of (or includes) the connection identifier associated with EFB port 502.

Figure 9:
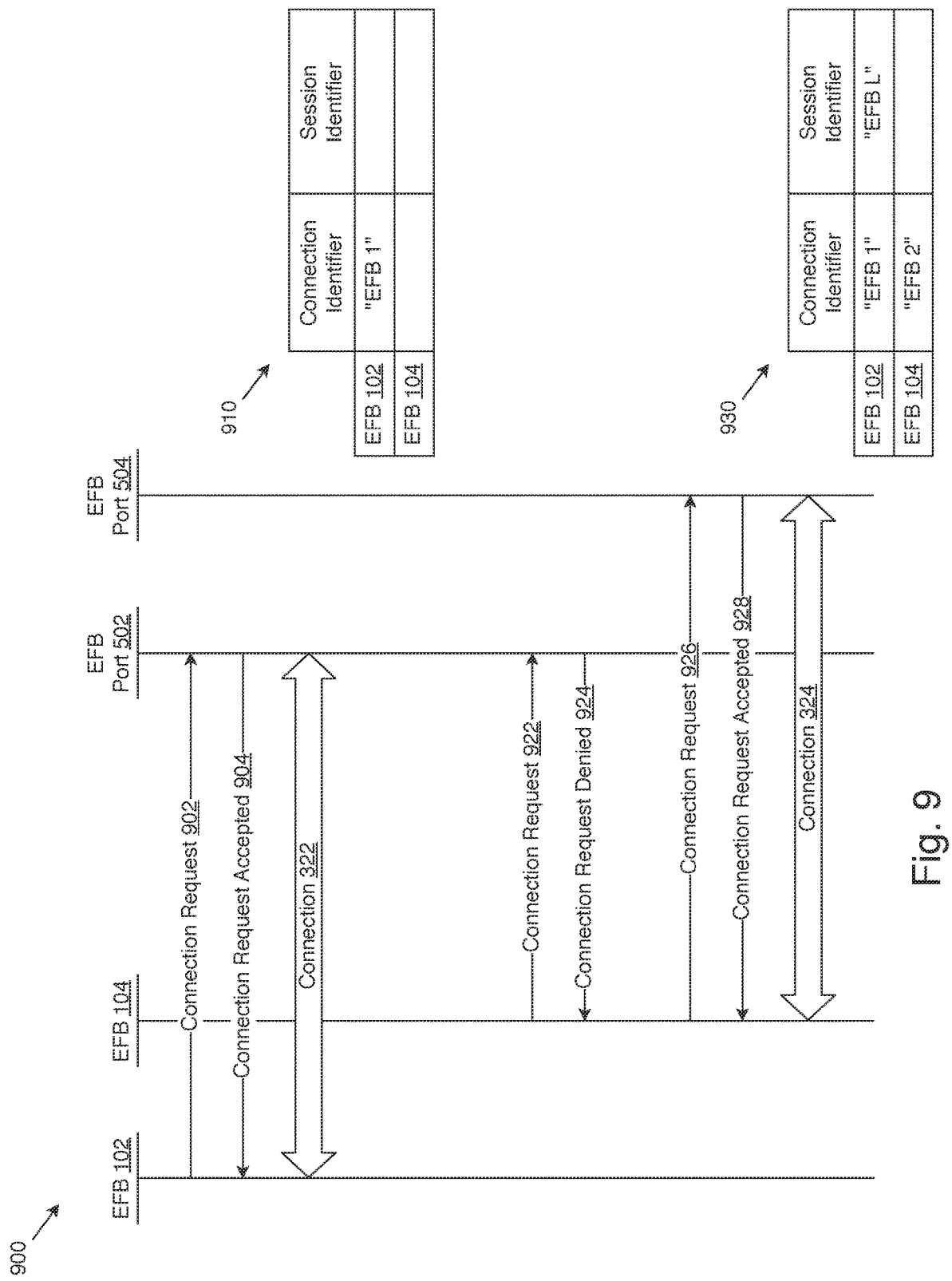
FIG. 9 depicts a message flow for establishing connections between EFBs and an AID of an onboard system, according to one or more embodiments illustrated and described herein.

FIG. 9 depicts a message flow for establishing connection 322 between EFB 102 and AID 106, according to one or more embodiments illustrated and described herein. As shown, a message flow 900 includes EFB 102 sending a connection request message 902 to EFB port 502 and subsequently receiving a connection request accepted message 904 from EFB port 502. In the embodiment of FIG. 9, connection 322 is established as a result of (or based at least in part on) the exchange of connection request message 902 and connection request accepted message 904. Connection request message 902 and connection request accepted message 904 may be exchanged between EFB 102 and EFB port 502 over communication link 312 in link layer 310 (e.g., in the case of a bidirectional communication link), and connection 322 may be established in network layer 320, as examples.

In an embodiment, connection request accepted message 904 is associated with connection request message 902. For instance, connection request message 902 may include a request to establish a connection between EFB 102 and EFB port 502, and the connection request accepted message 904 may include an indication that the request to establish the connection was accepted (e.g., accepted by AID 106 and/or by EFB port 502). Messages and other communication described with respect to FIG. 9 (and other embodiments disclosed herein) can take the form of (or include) the communication described with respect to FIGS. 3 to 5 and elsewhere in the detailed description.

It should be understood that, as used herein, a communicative coupling or port "at" a respective communication layer is synonymous with a communicative coupling or port "in" a given communication layer. In addition, it should be appreciated that, if a given entity of system 100 is described as "receiving" a message from another entity of system 100, such disclosure further includes disclosure of the other entity "sending" the message to the given entity. Similarly, if a given entity of system 100 is described as "sending" a message to another entity of system 100, such disclosure may further include disclosure of the other entity "receiving" the message from the given entity.

In an embodiment, and with reference to FIG. 8a and FIG. 9, performing the first-EFB connection attempt at step 802 includes EFB 102 sending connection request message 902 to EFB port 502, and making the first-EFB connection determination at step 804 includes EFB 102 receiving the connection request accepted message 904 from EFB port 502. Making the first-EFB connection determination at step 804 may further include AID 106 (or another entity of system 100) making a determination that no EFB has an established connection with EFB port 502 and responsively sending the connection request accepted message 904 (e.g., via EFB port 502).

FIG. 9 further depicts an identifier table 910 that reflects connection identifier 612 for EFB 102 subsequent to setting the connection identifier to an identifier associated with EFB port 502—for example, subsequent to EFB 102 receiving connection request accepted message 904 from EFB port 502 and responsively setting the connection identifier. In identifier table 910, connection identifier 612 is set to initial identifier 662 (in pool of identifiers 650) which, as discussed above with reference to FIG. 6b, takes the form of identifier 652 having a value of "EFB 1" as reflected in identifier table 910.

FIG. 10a (mentioned above) depicts a method of establishing connection 322 between EFB 102 and AID 106, according to one or more embodiments illustrated and described herein, and as previously indicated, establishing connection 322 at step 702 may include system 100 carrying out the steps of the depicted method. As shown, a method 1000 begins at step 1002 with system 100 obtaining an initial FMC status message comprising first session information for FMC 112. At step 1004, and based on the first session information, system 100 makes a first session determination that no EFB has an established session with FMC 112. At step 1006 and in response to making the first session determination, system 100 sets connection identifier 612 for EFB 102 to initial identifier 662 in pool of identifiers 650. In such an embodiment, the connection identifier with which connection 322 is associated takes the form of (or includes) initial identifier 662.

Figure 11:
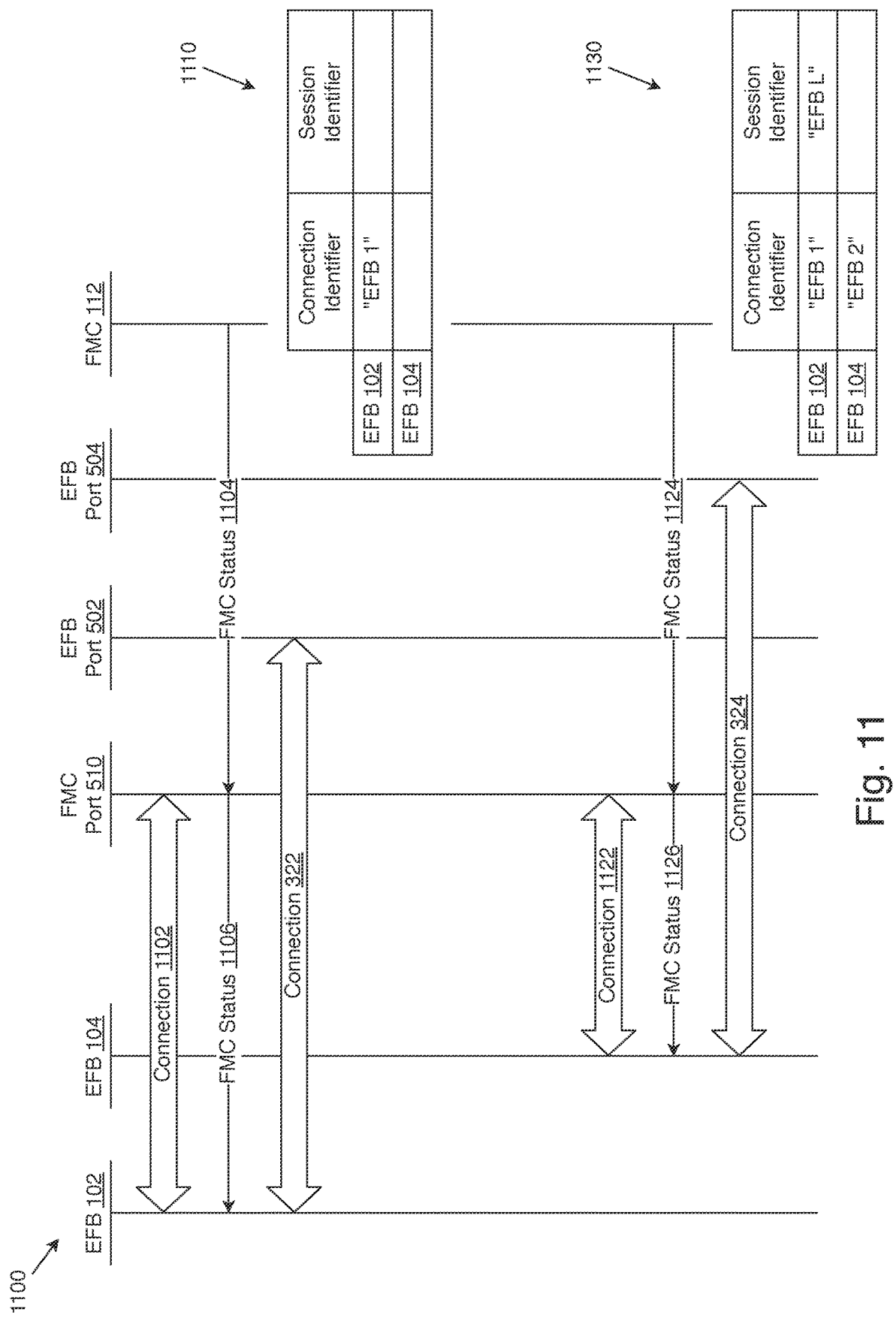
FIG. 11 depicts a message flow for establishing connections between EFBs and an AID, according to one or more embodiments illustrated and described herein.

FIG. 11 depicts a message flow for establishing connection 322 between EFB 102 and AID 106, according to one or more embodiments illustrated and described herein. As shown, a message flow 1100 includes establishing a connection 1102 between EFB 102 and FMC port 510. FMC port 510 receives an FMC status message 1104 from FMC 112, and the FMC port sends an FMC status message 1106 to EFB 102 over connection 1102. FMC status message 1106 sent to EFB 102 may take the form of FMC status message 1104 received from FMC 112, or could take the form of another FMC status message that is based on FMC status message 1104, among numerous other possibilities. In some embodiments, connection 1102 is established in link layer 310 (e.g., connection 1102 takes the form of a given communication link in the link layer), and communication for connection 1102 (including FMC status message 1106 over connection 1102) is sent over communication link 512 from FMC port 510 to EFB 102. However, it will be appreciated that FMC status message 1106 could instead (or also) be sent over a communication link other than communication link 512, and that connection 1102 could be in one or more different and/or additional communication layers.

FMC status message 1106 may include an indication or other data reflecting that no EFB has an established session with FMC 112. For instance, FMC status message 1106 could indicate a number of EFBs (or other entities of system 100) that have an established session with FMC 112. In an embodiment, FMC status message 1106 takes the form of an ARINC 429 message, even if the communication link over which the FMC status message is sent takes the form of a communication link other than an ARINC 429 data bus. For instance, the ARINC 429 message could be encapsulated within an IP packet or other message that is then sent over a non-ARINC 429 communication link.

In some embodiments, FMC port 510 sends FMC status message 1106 in response to system 100 establishing connection 1102 between EFB 102 and FMC port 510. In another embodiment, FMC port 510 sends FMC status messages (including FMC status message 1106) to EFB 102 (or another EFB connected to FMC port 510) at one or more predetermined times (e.g., periodically) subsequent to system 100 establishing connection 1102 between EFB 102 and FMC port 510. Other examples are possible as well.

In an embodiment, and with reference to FIG. 10a and FIG. 11, obtaining the initial FMC status message at step 1002 includes EFB 102 receiving FMC status message 1106, and making the first session determination at step 1004 involves making the determination based on session information for FMC 112 that is included in FMC status message 1106. As shown in FIG. 11, system 100 may establish connection 322 between EFB 102 and AID 106 subsequent to EFB 102 receiving FMC status message 1106 (e.g., subsequent to setting connection identifier 612 for EFB 102 in response to making the first session determination based on the first session information in FMC status message 1106).

FIG. 11 further depicts an identifier table 1110 that reflects connection identifier 612 for EFB 102 subsequent to setting the connection identifier to initial identifier 662—for example, subsequent to setting connection identifier 612 in response to making the first session determination based on the first session information in FMC status message 1106. In identifier table 1110, connection identifier 612 is set to initial identifier 662 (in pool of identifiers 650) which, as discussed above with reference to FIG. 6b, takes the form of identifier 652 having a value of "EFB 1" as reflected in identifier table 1110.

Setting connection identifier 612 for EFB 102 could be a centralized process or a distributed process, among other possibilities. For instance, a centralized process could include AID 106, CMU 108, and/or FMC 112 setting connection identifier 612 and, as will be described in additional detail below, could additionally include the same entity of system 100 setting connection identifier 614 for EFB 104. A distributed process could include EFB 102 setting connection identifier 612 for itself and, as also described below, could further include EFB 104 setting connection identifier 614 for itself. In such a distributed process, the instructions stored in the respective data storages of the EFBs and executed by the respective processors of the EFBs may include identical instructions to set the respective connection identifiers for the EFBs—for example, such that the process for setting the respective connection identifiers is consistent between the EFBs.

Moreover, in one or more of the embodiment described herein, the identifier to which connection identifier 612 is set may be determined at EFB 102 and/or provided by AID 106 (e.g., via EFB port 502), among other possibilities. For instance, the data storage of EFB 102 may store data indicating that initial identifier 662 is associated with EFB port 502. In the embodiment of FIG. 8a, performing the first-EFB connection attempt at step 802 may include EFB 102 attempting to establish a connection between EFB 102 and an EFB port which the stored data indicates is associated with initial identifier 662 (i.e., EFB port 502). As an example, the stored data may indicate that the EFB port associated with initial identifier 662 takes the form of a wireless access point with a given Service Set Identifier (SSID), Basic Service Set Identifier (BSSID), Media Access Control (MAC) address, or other access point identifier. In such an example, the first-EFB connection attempt at step 802 may include EFB 102 attempting to establish a connection between EFB 102 and the given access point which the stored data indicates is associated with initial identifier 662. In response to making the first-EFB connection determination at step 804 (that the first-EFB connection attempt was successful), EFB 102 at step 806 may set connection identifier 612 (for EFB 102) to the connection identifier associated with the EFB port that was part of the first-EFB connection attempt at step 802. As another possibility, in the embodiment of FIG. 10a, setting connection identifier 612 at step 1006 may include EFB 102 setting connection identifier 612 to the identifier associated with EFB port 502 as indicated by the stored data (i.e., initial identifier 662). In such an embodiment, connection 322 may take the form of a connection between EFB 102 and an EFB port to which initial identifier 662 is associated (e.g., the wireless access point described above), as indicated by the stored data. In some embodiments, AID 106 (or CMU 108 or FMC 112) sets connection identifier 612, which AID 106 could then provide to EFB 102 (for example, via connection 322). Other examples are possible as well.

Referring again to FIG. 7, at step 704 of method 700, system 100 sets session identifier 622 for EFB 102 in response to a session request by EFB 102 over connection 322 between EFB 102 and AID 106. The session request by EFB 102 could take the form of, for example, a session request by EFB 102 in response to establishing connection 322 at step 702. In addition, at step 706, system 100 establishes session 332 between EFB 102 and FMC 112 based on session identifier 622. In the embodiment of FIG. 7, session 332 between EFB 102 and FMC 112 is established over connection 322 between EFB 102 and AID 106 in accordance with connection identifier 612 for EFB 102. For instance, session 332 may take the form of a session established over the connection associated with connection identifier 612, and in the embodiment of FIG. 7, the connection associated with connection identifier 612 is connection 322. Establishing session 332 in accordance with connection identifier 612 may include routing data for the session based on the connection identifier, which in turn could include routing data for session 332 based on connection 322 with which connection identifier 612 is associated (and over which the session is established).

As an example, system 100 may route data for session 332 from EFB 102 to FMC 112. EFB 102 may receive input via a user interface of the EFB (such as a touchscreen display), and EFB port 502 (and/or AID 106 generally) may receive data for session 332 from EFB 102 over connection 322, the received data being based on the input received via the user interface of the EFB. The data could take the form of a payload in one or more packets, among many other possibilities. Based on the data received from EFB 102, port 422 of AID 106 (associated with EFB port 502) may send data for session 332 to CMU 108 over communication link 315 (also associated with EFB port 502) from port 422 to CMU 108. Sending data for session 332 may include port 422 forwarding data received from EFB 102, such as data in the form of the previously-mentioned payload in one or more packets received from EFB 102.

CMU 108 may receive the data from port 422 of AID 106, and may determine that the data was received over a communication link associated with EFB port 502 (i.e., communication link 315). In some embodiments, a data storage of CMU 108 includes data regarding a connection status of EFB port 502. For instance, the data may indicate that a connection (i.e., connection 322) has been established between a given EFB (i.e., EFB 102) and EFB port 502, and the data may indicate that connection identifier 612 has been set for the given EFB. CMU 108 may send data for session 332 based on the data received from port 422—e.g., by forwarding data received from port 422 such as a payload in one or more packets received from port 422—and the data sent from CMU 108 to FMC 112 may include a session identifier for the given EFB. For instance, the data storage of CMU 108 may further include data indicating that session identifier 622 has been set for the given EFB, and the data sent from CMU 108 to FMC 112 may include session identifier 622.

In an embodiment, session identifier 622 takes the form of a session identifier associated with MCDU 152 (e.g., a session identifier associated with a crew member seated in the aircraft in proximity to MCDU 152), though it will be appreciated that session identifier 622 could instead be associated with MCDU 154 (or another MCDU of the aircraft). It should be understood, however, that session identifier 622 need not be associated with a given MCDU, and that the session identifier could take other forms without departing from the scope of the disclosure.

FMC 112 may perform one or more FMC functions based on data received by the FMC for session 332. For instance, the data received by FMC 112 for session 332 may include instructions from EFB 102 to FMC 112 (e.g., regarding airway procedures, flight procedures, and/or aircraft control), instructions or other data from EFB 102 that could otherwise be received by FMC 112 from MCDU 152 (e.g., with which session identifier 622 is associated) and/or MCDU 154, or a combination of these or other data, among other possibilities.

As another example, system 100 may route data for session 332 from FMC 112 to EFB 102. For instance, the data for session 332 may be routed from FMC 112 to EFB 102 by the reverse of the process for routing data for session 332 from EFB 102 to FMC 112 described above, as will be understood by those of skill in the art. The data for session 332 from FMC 112 to EFB 102 may include data regarding airway procedures, flight procedures, and/or aircraft status, data that could otherwise by sent from FMC 112 to MCDU 152 (e.g., with which session identifier 622 is associated) and/or MCDU 154, or a combination of these or other data, among many other examples. EFB 102 may present output via a user interface of the EFB based on data from FMC 112 for session 332.

Figure 12B:
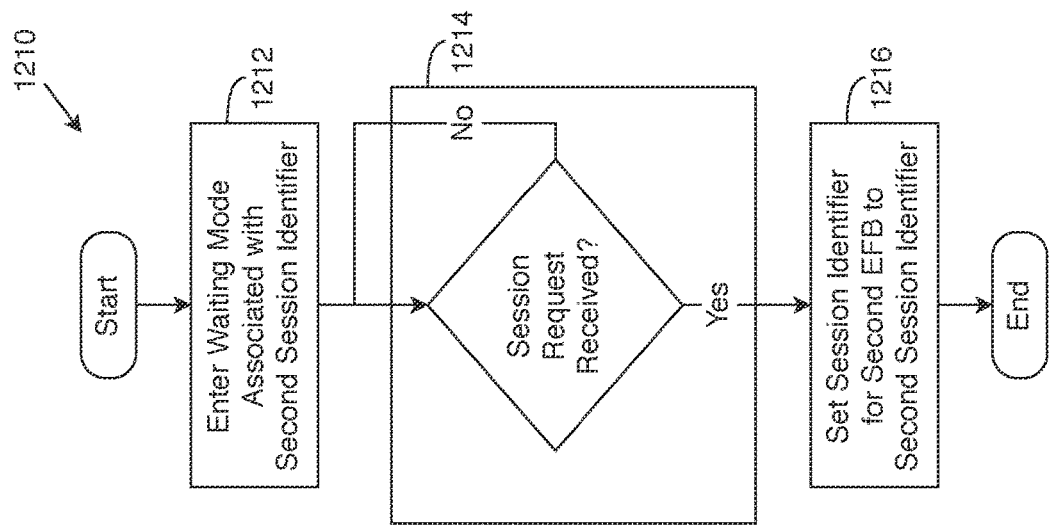
FIG. 12b depicts a method of setting a session identifier for a second EFB, according to one or more embodiments illustrated and described herein.
Figure 12A:
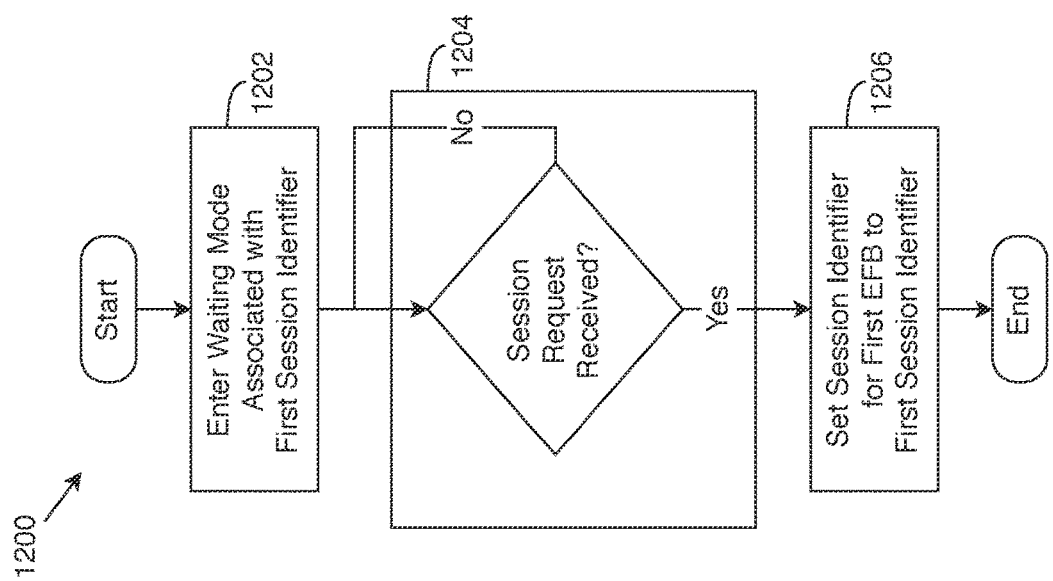
FIG. 12a depicts a method of setting a session identifier for a first EFB, according to one or more embodiments illustrated and described herein.

FIG. 12a depicts a method of setting session identifier 622 for EFB 102, according to one or more embodiments illustrated and described herein, and setting the session identifier at step 704 may include system 100 carrying out the steps of the method. As shown, a method 1200 begins at step 1202 with system 100 setting FMC 112 to a first waiting mode associated with a first session identifier. The method further includes, at step 1204, system 100 receiving the session request by EFB 102 while FMC 112 is set to the first waiting mode associated with the first session identifier. At step 1206 and in response to receiving the session request by EFB 102, system 100 sets session identifier 622 for EFB 102 to the first session identifier.

Figure 13:
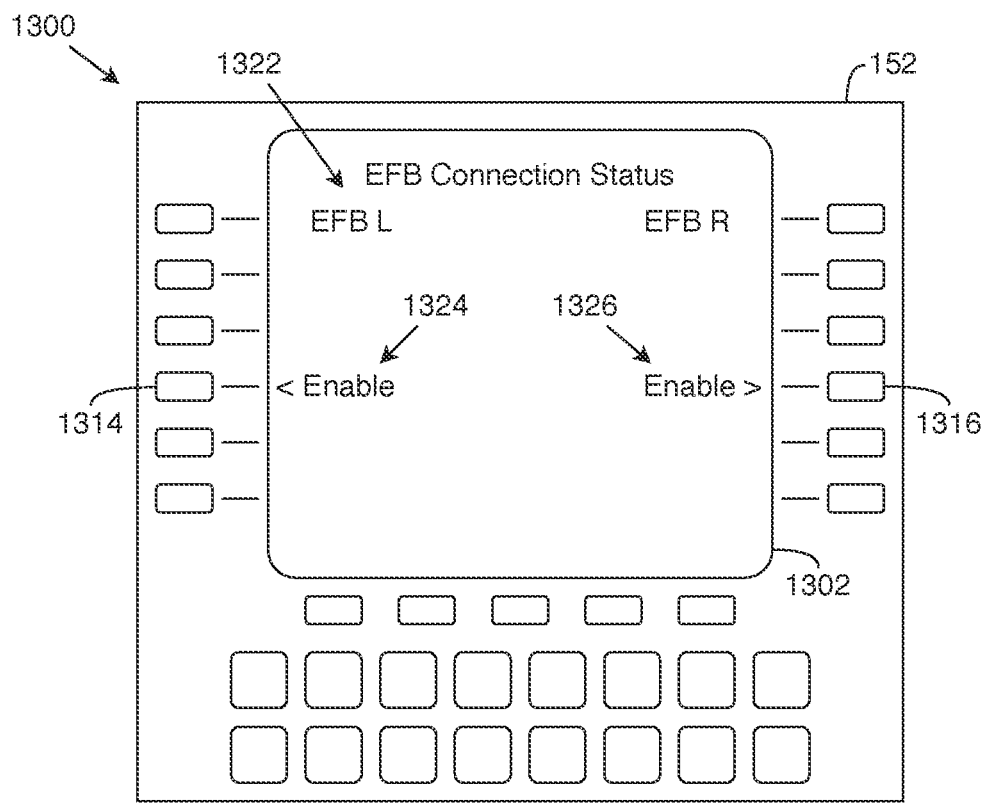
FIG. 13 depicts a presentation by a user interface of an onboard system prior to setting an FMC to a first waiting mode, according to one or more embodiments illustrated and described herein.

FIG. 13 depicts a presentation by a user interface of an onboard system prior to setting an FMC to a first waiting mode, according to one or more embodiments illustrated and described herein. As shown, MCDU 152 initially displays a presentation 1300 that includes a session status display element 1322, a first EFB indication element 1324, and a second EFB indication element 1326. MCDU 152 includes a display device 1302, and further includes a soft key 1314 and a soft key 1316 (e.g., among possibly many other input keys of MCDU 152). Session status display element 1322 includes text indicating a session status for a first EFB identified as "EFB L," and also includes text indicating a session status for a second EFB identified as "EFB R." Specifically, session status display element 1322 indicates that neither EFB L nor EFB R has an established session with FMC 112. First EFB indication element 1324 is positioned in proximity to soft key 1314, and second EFB indication element 1326 is positioned in proximity to 1316.

In an embodiment, setting FMC 112 to a first waiting mode associated with a first session identifier at step 1202 includes receiving, via MCDU 152, an input associated with the first session identifier. As an example, the first session value could have a value of "EFB L," and the input could take the form of a button press of soft key 1314 associated with session identifier "EFB L."

FIG. 14a depicts a presentation by a user interface while an FMC is set to a first waiting mode, according to one or more embodiments illustrated and described herein. In the illustrated embodiment, while FMC 112 is set to the first waiting mode, MCDU 152 displays a presentation 1400. For instance, system 100 may display presentation 1400 in response to setting FMC 112 to the first waiting mode. As shown, presentation 1400 may include a session status display element 1422 that includes text indicating a session status for an EFB (if any) for which the respective session identifier is set to "EFB L."

In an embodiment, and with reference to FIG. 12 and FIG. 14*a*, the first session identifier takes the form of a session identifier having a value of "EFB L." At step 1206 and in response to receiving the session request by EFB 102, system 100 sets session identifier 622 for EFB 102 to the first session identifier having the value of "EFB L."

FIG. 14*a* further depicts an identifier table 1430 that reflects session identifier 622 for EFB 102 subsequent to setting session identifier 622 to the session identifier with which the first waiting mode is associated. In identifier table 1430, connection identifier 612 is set to "EFB 1" (which is the value of initial identifier 662 that takes the form of identifier 652 in pool of identifiers 650), and session identifier 622 is set the first session identifier which, in the embodiment of FIG. 14*a*, has a value of "EFB L." In some embodiments, system 100 may display a presentation indicating that the EFB for which the respective session identifier is set to "EFB L" (in this example, EFB 102) has an established session with FMC 112.

Method 700 additionally includes system 100, at step 708, establishing connection 324 between EFB 104 and AID 106. In the embodiment of FIG. 7, connection 324 between EFB 104 and AID 106 is associated with connection identifier 614 for EFB 104. As will be discussed in additional detail with respect to subsequent steps of method 700, session 334 between EFB 104 and FMC 112 is established over connection 324 between EFB 104 and AID 106 in accordance with connection identifier 614. Establishing connection 324 at step 708 may include system 100 carrying out the steps of one or more of the methods described below with reference to FIG. 8*b* and FIG. 10*a*, as just a couple of examples.

Figure 8B:
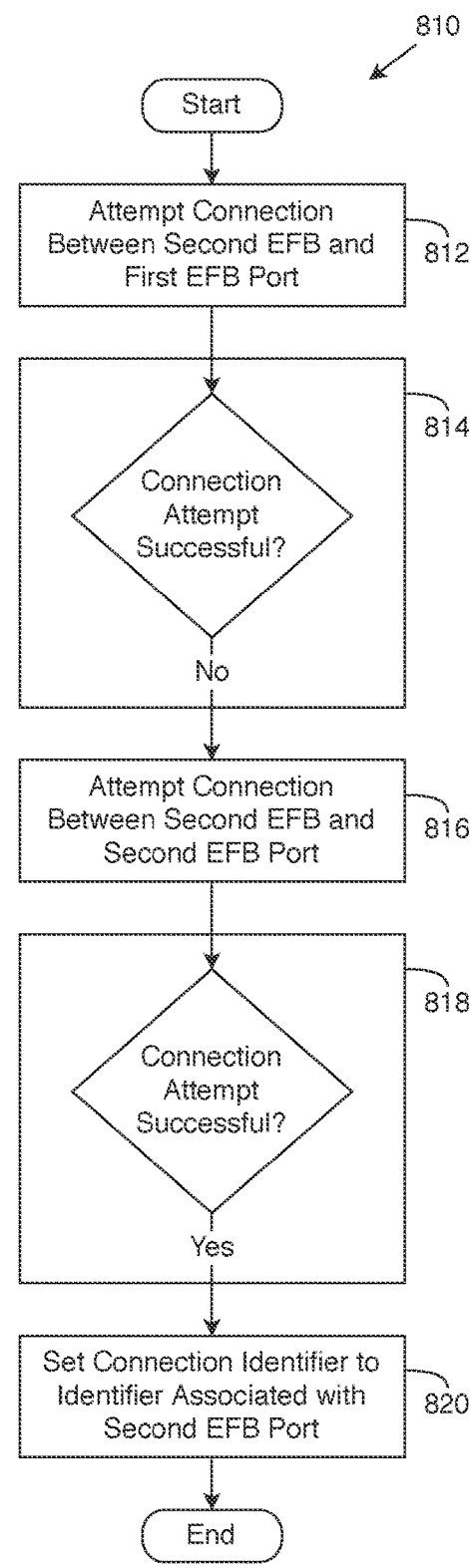
FIG. 8b depicts a method of setting a connection identifier for a second EFB, according to one or more embodiments illustrated and described herein.

Specifically, FIG. 8*b* depicts a method of setting connection identifier 614 for EFB 104, according to one or more embodiments illustrated and described herein. As shown, a method 810 begins at step 812 with system 100 performing an initial second-EFB connection attempt to establish a connection between EFB 104 and EFB port 502 of AID 106. The method continues at step 814 with system 100 making an initial second-EFB connection determination that the initial second-EFB connection attempt was unsuccessful. At step 816 and in response to making the initial second-EFB connection determination, system 100 performs a subsequent second-EFB connection attempt to establish a connection between EFB 104 and EFB port 504 of AID 106. Method 810 continues at step 818 with system 100 making a subsequent second-EFB connection determination that the subsequent second-EFB connection attempt was successful. At step 820 and in response to making the subsequent second-EFB connection determination, system 100 sets connection identifier 614 for EFB 104 to an identifier associated with EFB port 504.

With reference again to FIG. 9, message flow 900 further comprises a message flow for establishing connection 324 between EFB 104 and AID 106, according to one or more embodiments illustrated and described herein. As shown, message flow 900 includes EFB 104 sending a connection request message 922 to EFB port 502 and subsequently receiving a connection request denied message 924 from EFB port 502. In response, EFB 104 sends a connection request message 926 to EFB port 504 and subsequently receives a connection request accepted message 928 from EFB port 504. In the embodiment of FIG. 9, connection 324 is established as a result of (or based at least in part on) the exchange of connection request message 926 and connection request accepted message 928. Connection request message 922 and connection request denied message 924 may be exchanged between EFB 104 and EFB port 502 over communication link 314 in link layer 310 (e.g., in the case of a bidirectional communication link), and connection request message 926 and connection request accepted message 928 may be exchanged between EFB 104 and EFB port 504 over the same communication link or a different communication link, as examples. Connection 324 may be established in network layer 320 or another layer (or combination of layers).

In an embodiment, connection request denied message 924 is associated with connection request message 922. For instance, connection request message 922 may include a request to establish a connection between EFB 104 and EFB port 502, and the connection request denied message 924 may include an indication that the request to establish the connection was denied (e.g., denied by AID 106 and/or by EFB port 502). Similarly, connection request accepted message 928 may be associated with connection request message 926. As an example, connection request message 926 may include a request to establish a connection between EFB 104 and EFB port 504, and connection request accepted message 928 may include an indication that the request to establish the connection was accepted (e.g., accepted by AID 106 and/or by EFB port 504).

In an embodiment, and with reference to FIG. 8*b* and FIG. 9, performing the initial second-EFB connection attempt at step 812 includes EFB 104 sending connection request message 922 to EFB port 502, and making the initial second-EFB connection determination at step 814 includes EFB 104 receiving connection request denied message 924 from EFB port 502. Making the initial second-EFB connection determination at step 814 may further include AID 106 (or another entity of system 100) making a determination that another EFB (e.g., EFB 102) has an established connection with EFB port 502, and may also include the AID responsively sending connection request denied message 924 (e.g., via EFB port 502). In addition, performing the subsequent second-EFB connection attempt at step 816 may include EFB 104 sending connection request message 926 to EFB port 504, and making the subsequent second-EFB connection determination at step 818 may include EFB 104 receiving connection request accepted message 928 from EFB port 504. Making the subsequent second-EFB connection determination at step 818 may further include AID 106 (or another entity of system 100) making a determination that no EFB has an established connection with EFB port 504 and responsively sending the connection request accepted message 928 (e.g., via EFB port 504).

FIG. 9 further depicts an identifier table 930 that reflects connection identifier 614 for EFB 104 subsequent to setting the connection identifier to an identifier associated with EFB port 504—for example, subsequent to EFB 104 receiving connection request accepted message 928 from EFB port 504 and responsively setting the connection identifier. In identifier table 930, connection identifier 614 is set to next identifier 664 (in pool of identifiers 650) which, as discussed above with reference to FIG. 6*b*, takes the form of identifier 654 having a value of "EFB 2" as reflected in identifier table 930. In addition, connection identifier 612 is set to initial identifier 662 (which takes the form of identifier 652 having a value of "EFB 1"), and session identifier 622 is set to the first session identifier having a value of "EFB L" in the embodiment of FIG. 14a, reflecting that system 100 has already established connection 322 and that the system has already established session 332.

FIG. 10b (mentioned above) depicts a method of establishing connection 324 between EFB 104 and AID 106, according to one or more embodiments illustrated and described herein, and as previously indicated, establishing connection 324 at step 708 may include system 100 carrying out the steps of the depicted method. As shown, a method 1010 begins at step 1012 with system 100 obtaining a subsequent FMC status message comprising second session information for FMC 112. At step 1014, and based on the second session information, system 100 makes a second session determination that EFB 102 has an established session with FMC 112. Method 1010 further includes system 100, at step 1016 and in response to making the second session determination, setting connection identifier 614 for EFB 104 to next identifier 664 in pool of identifiers 650. In the embodiment of FIG. 10b, next identifier 664 takes the form of (or includes) a next identifier with respect to initial identifier 662 in pool of identifiers 650.

With reference again to FIG. 11, message flow 1100 further comprises a message flow for establishing connection 324 between EFB 104 and AID 106, according to one or more embodiments illustrated and described herein. As shown, message flow 1100 includes establishing a connection 1122 between EFB 104 and FMC port 510. FMC port 510 receives an FMC status message 1124 from FMC 112, and the FMC port sends an FMC status message 1126 to EFB 104 over connection 1122. FMC status message 1126 sent to EFB 104 may take the form of FMC status message 1124 received from FMC 112, or could take the form of another FMC status message that is based on FMC status message 1124, among numerous other possibilities. As with FMC status message 1106, FMC status message 1126 may be sent in response to system 100 establishing connection 1122 between EFB 104 and FMC port 510, or FMC status message 1126 may be sent at one or more predetermined times, among many other possible examples. In some embodiments, connection 1122 is established in link layer 310 (e.g., connection 1102 takes the form of a given communication link in the link layer), and communication for connection 1122 (including FMC status message 1126 over connection 1122) is sent over communication link 514 from FMC port 510 to EFB 104. However, it will be appreciated that FMC status message 1126 could instead (or also) be sent over a communication link other than communication link 514, and that connection 1122 could be in one or more different and/or additional communication layers.

FMC status message 1126 may include an indication or other data reflecting that at least one EFB has an established session with FMC 112. For instance, FMC status message 1126 may include an indication of the number of EFBs (or other entities of system 100) having an established session with FMC 112. As another example, FMC status message 1126 may include an identification of the EFBs or other entities (e.g., a connection identifier for the EFBs) having an established session with FMC 112. In an embodiment, FMC status message 1126 takes the form of an ARINC 429 message—for example, encapsulated within an IP packet or other message that is then sent over a non-ARINC 429 communication link.

In an embodiment, and with reference to FIG. 10b and FIG. 11, obtaining the subsequent FMC status message at step 1012 includes EFB 104 receiving FMC status message 1126, and making the second session determination at step 1014 involves making the determination based on session information for FMC 112 that is included in FMC status message 1126. As shown in FIG. 11, system 100 may establish connection 324 between EFB 104 and AID 106 subsequent to EFB 104 receiving FMC status message 1126 (e.g., subsequent to setting connection identifier 614 for EFB 104 in response to making the first session determination based on the second session information in FMC status message 1126).

FIG. 11 further depicts an identifier table 1130 that reflects connection identifier 614 for EFB 104 subsequent to setting the connection identifier to next identifier 664—for example, subsequent to setting connection identifier 614 in response to making the second session determination based on the second session information in FMC status message 1126. In identifier table 1130, connection identifier 614 is set to next identifier 664 (in pool of identifiers 650) which, as discussed above with reference to FIG. 6b, takes the form of identifier 654 having a value of "EFB 2" as reflected in identifier table 1130. In addition, connection identifier 612 is set to initial identifier 662 (which takes the form of identifier 652 having a value of "EFB 1"), and session identifier 622 is set to the first session identifier having a value of "EFB L" in the embodiment of FIG. 14a, reflecting that system 100 has already established connection 322 and that the system has already established session 332.

With reference again to FIG. 7, method 700 continues at step 710 with system 100 setting session identifier 624 for EFB 104 in response to a session request by EFB 104 over connection 324 between EFB 104 and AID 106. At step 712, system 100 establishes session 334 between EFB 104 and FMC 112 based on session identifier 624 for EFB 104. In the embodiment of FIG. 7, session 334 between EFB 104 and FMC 112 is established over connection 324 between EFB 104 and AID 106 in accordance with connection identifier 614 for EFB 104.

Referring again to FIG. 7, at step 710 of method 700, system 100 sets session identifier 624 for EFB 104 in response to a session request by EFB 104 over connection 324 between EFB 104 and AID 106. The session request by EFB 104 could take the form of, for example, a session request by EFB 104 in response to establishing connection 324 at step 708. In addition, at step 712, system 100 establishes session 334 between EFB 104 and FMC 112 based on session identifier 624. In the embodiment of FIG. 7, session 334 between EFB 104 and FMC 112 is established over connection 324 between EFB 104 and AID 106 in accordance with connection identifier 614 for EFB 102. For instance, session 334 may take the form of a session established over the connection associated with connection identifier 614, and in the embodiment of FIG. 7, the connection associated with connection identifier 614 is connection 324. Establishing session 334 in accordance with connection identifier 614 may include routing data for the session based on the connection identifier, which in turn could include routing data for session 334 based on connection 324 with which connection identifier 614 is associated (and over which the session is established). As an example, system 100 may route data for session 334 from EFB 104 to FMC 112, and may route data for session 334 from FMC 112 to EFB 104, in a manner similar to that described above with respect to routing data for session 332.

FIG. 12b depicts a method of setting session identifier 624 for EFB 104, according to one or more embodiments illustrated and described herein, and setting the session identifier at step 710 may include system 100 carrying out the steps of the method. As shown, a method 1210 begins at step 1212 with system 100 setting FMC 112 to a second waiting mode associated with a second session identifier. The method further includes, at step 1214, system 100 receiving the session request by EFB 104 while FMC 112 is set to the second waiting mode associated with the second session identifier. At step 1216 and in response to receiving the session request by EFB 104, system 100 sets session identifier 624 for EFB 104 to the second session identifier.

FIG. 14*b* depicts a presentation by a user interface while an FMC is set to a second waiting mode, according to one or more embodiments illustrated and described herein. In the illustrated embodiment, while FMC 112 is set to the second waiting mode, MCDU 152 displays a presentation 1450. For instance, system 100 may display presentation 1450 in response to setting FMC 112 to the second waiting mode. As shown, presentation 1450 may include a session status display element 1472 that includes text indicating a session status for an EFB (if any) for which the respective session identifier is set to "EFB L," and may further include a session status display element 1474 that includes text indicating a session status for an EFB (if any) for which the respective session identifier is set to "EFB R." Setting FMC 112 to the second waiting mode associated with the second session identifier at step 1212 may include receiving, via MCDU 152, an input associated with the second session identifier. As an example, the input could take the form of a button press of soft key 1316 associated with session identifier "EFB R."

In an embodiment, and with reference to FIG. 12 and FIG. 14*b*, the second session identifier takes the form of a session identifier having a value of "EFB R." At step 1216 and in response to receiving the session request by EFB 104, system 100 sets session identifier 624 for EFB 104 to the second session identifier having the value of "EFB R."

FIG. 14*b* further depicts an identifier table 1480 that reflects session identifier 624 for EFB 104 subsequent to setting session identifier 624 to the session identifier with which the second waiting mode is associated. In identifier table 1480, connection identifier 614 is set to "EFB 2" (which is the value of next identifier 664 that takes the form of identifier 654 in pool of identifiers 650), and session identifier 624 is set the second session identifier which, in the embodiment of FIG. 14*b*, has a value of "EFB R." In some embodiments, system 100 may display a presentation indicating that the EFB for which the respective session identifier is set to "EFB L" (in this example, EFB 102) has an established session with FMC 112. In addition, connection identifier 612 is set to initial identifier 662 (which takes the form of identifier 652 having a value of "EFB 1"), and session identifier 622 is set to the first session identifier having a value of "EFB L" in the embodiment of FIG. 14*a*, reflecting that system 100 has already established connection 322 and that the system has already established session 332.

In the embodiment of FIG. 14*b*, while FMC 112 is set to the waiting mode associated with session identifier "EFB R," system 100 receives the session request by EFB 104, which as noted above, may take the form of a session request by EFB 104 in response to establishing connection 324 at step 708 (among other possibilities). At step 1216 and in response to receiving the session request by EFB 104, system 100 sets session identifier 624 for EFB 104 to "EFB R." In some embodiments, system 100 may display a presentation indicating that the EFB for which the respective session identifier is set to "EFB R" (in this example, EFB 104) has an established session with FMC 112.

It should be appreciated that both connection identifier 612 (for EFB 102) and connection identifier 614 (for EFB 104) could be set before either of session identifier 622 (for EFB 102) and session identifier 624 (for EFB 104) are set. As an example, both method 800 and method 810, or both method 1000 and 1010, could be carried out before either of session identifier 622 and session identifier 624 are set. As another example, both connection 322 and connection 324 could be established at step 702 and step 708, respectively, before either of session identifier 622 and session identifier 624 are set at step 704 and step 710, respectively. When (i) both connection identifier 612 and connection identifier 614 are set, (ii) neither of session identifier 622 and session identifier 624 are, and (iii) FMC 112 is set to a waiting mode associated with a given session identifier (e.g., "EFB L"), a race condition may occur if system 100 receives respective session requests by both EFB 102 and EFB 104. To allow system 100 to untie the race condition, FMC status messages received by EFB 102 and EFB 104 may include an identification information—for example, an identification of the EFB that successfully established a session with FMC 112—and each of the EFBs could determine whether it established a session with FMC 112 based on the identification information. The session requests by EFB 102 and EFB 104 could include respective unique identifiers of the EFBs (e.g., a Universally Unique Identifier (UUID), a MAC address, and/or a connection identifier), and the identification information could include the unique identifier of the EFB that successfully established the session with FMC 112.

Although method 700 (and other embodiments presented herein) may be described with respect to FMC 112, it will be understood by those of skill in the art that the described methods may instead be carried out with respect to FMC 114 (or another FMC)—for example, in the event of a failure of FMC 112 that requires FMC 114 to function as the primary FMC of system 100. In addition, though various embodiments herein are described with respect to EFB 102 while other embodiments are described with respect to EFB 104, it will be appreciated that EFB 104 may be substituted for EFB 102 and that EFB 102 may be substituted for EFB 104. In other words, EFB 102 and EFB 104 may be switched in the described embodiments. Similarly, in some embodiments, MCDU 154 is substituted for MCDU 152 and MCDU 152 is substituted for MCDU 154 (i.e., MCDU 152 and MCDU 154 are switched).

It will be appreciated by those of skill in the art that numerous variations are possible with respect to the above-described embodiments. For instance, in an embodiment, system 100 establishes connection 322 (the connection being associated with connection identifier 612), and the system makes a first session determination that no EFB has an established session with FMC 112. In response to making the first session determination, system 100 establishes session 332 based on session identifier 622, the session being established over connection 322 in accordance with connection identifier 612. In addition, system 100 establishes connection 324 (the connection being associated with connection identifier 614), and the system makes a second session determination that an EFB (e.g., EFB 102) has an established session with FMC 112. In response to making the second session determination, system 100 establishes session 334 based on session identifier 624, the session being established over connection 324 in accordance with connection identifier 614. Making the first session determination may include carrying out the steps of method 800 and/or method 1000, and making the second session determination may include carrying out the steps of method 810 and/or method 1010. Many other variations are possible as well.

It should now be understood that embodiments described herein are directed to onboard systems, computing devices, and methods for establishing multiple EFB sessions with an FMC. Because connections between the EFBs and an AID are associated with respective connection identifiers for the EFBs, and because sessions between the EFBs and the FMC are established over the respective connections in accordance with the connection identifiers, it may be possible for the FMC to distinguish between the EFBs and to allow each pilot to use his or her own EFB to interact with the FMC.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

A method carried out by an onboard system, the method comprising: establishing a connection between a first electronic flight bag (EFB) and an aircraft interface device (AID), the connection between the first EFB and the AID being associated with a connection identifier for the first EFB; setting a session identifier for the first EFB in response to a session request by the first EFB over the connection between the first EFB and the AID; establishing a session between the first EFB and a flight management computer (FMC) based on the session identifier for the first EFB, wherein the session between the first EFB and the FMC is established over the connection between the first EFB and the AID in accordance with the connection identifier for the first EFB; establishing a connection between a second EFB and the AID, the connection between the second EFB and the AID being associated with a connection identifier for the second EFB; setting a session identifier for the second EFB in response to a session request by the second EFB over the connection between the second EFB and the AID; and establishing a session between the second EFB and the FMC based on the session identifier for the second EFB, wherein the session between the second EFB and the FMC is established over the connection between the second EFB and the AID in accordance with the connection identifier for the second EFB.

The method of any preceding clause, wherein the AID comprises a first EFB port, wherein establishing the connection between the first EFB and the AID comprises: performing a first-EFB connection attempt to establish a connection between the first EFB and the first EFB port of the AID; making a first-EFB connection determination that the first-EFB connection attempt was successful; and in response to making the first-EFB connection determination, setting the connection identifier for the first EFB to an identifier associated with the first EFB port.

The method of any preceding clause, wherein the AID further comprises a second EFB port, wherein establishing the connection between the second EFB and the AID comprises: performing an initial second-EFB connection attempt to establish a connection between the second EFB and the first EFB port of the AID; making an initial second-EFB connection determination that the initial second-EFB connection attempt was unsuccessful; in response to making the initial second-EFB connection determination, performing a subsequent second-EFB connection attempt to establish a connection between the second EFB and the second EFB port of the AID; making a subsequent second-EFB connection determination that the subsequent second-EFB connection attempt was successful; and in response to making the subsequent second-EFB connection determination, setting the connection identifier for the second EFB to an identifier associated with the second EFB port.

The method of any preceding clause, wherein establishing the connection between the first EFB and the AID comprises: obtaining an initial FMC status message comprising first session information for the FMC; based on the first session information, making a first session determination that no EFB has an established session with the FMC; and in response to making the first session determination, setting the connection identifier for the first EFB to an initial identifier in a pool of identifiers.

The method of any preceding clause, wherein establishing the connection between the second EFB and the AID comprises: obtaining a subsequent FMC status message comprising second session information for the FMC; based on the second session information, making a second session determination that the first EFB has an established session with the FMC; and in response to making the second session determination, setting the connection identifier for the second EFB to a next identifier in the pool of identifiers, the next identifier comprising a next identifier with respect to the initial identifier.

The method of any preceding clause, wherein setting the session identifier for the first EFB comprises: setting the FMC to a first waiting mode associated with a first session identifier; receiving the session request by the first EFB while the FMC is set to the first waiting mode associated with the first session identifier; and in response to receiving the session request by the first EFB, setting the session identifier for the first EFB to the first session identifier.

The method of any preceding clause, wherein setting the session identifier for the second EFB comprises: setting the FMC to a second waiting mode associated with a second session identifier; receiving the session request by the second EFB while the FMC is set to the second waiting mode associated with the second session identifier; and in response to receiving the session request by the second EFB, setting the session identifier for the second EFB to the second session identifier.

An onboard system comprising a flight management computer (FMC), an aircraft interface device (AID), a first electronic flight bag (EFB), a second EFB, a processor, and a non-transitory computer-readable storage medium comprising instructions that, when executed by the processor, cause the onboard system to: establish a connection between the first EFB and the AID, the connection between the first EFB and the AID being associated with a connection identifier for the first EFB; set a session identifier for the first EFB in response to a session request by the first EFB over the connection between the first EFB and the AID; establish a session between the first EFB and the FMC based on the session identifier for the first EFB, wherein the session between the first EFB and the FMC is established over the connection between the first EFB and the AID in accordance with the connection identifier for the first EFB; establish a connection between a second EFB and the AID, the connection between the second EFB and the AID being associated with a connection identifier for the second EFB; set a session identifier for the second EFB in response to a session request by the second EFB over the connection between the second EFB and the AID; and establish a session between the second EFB and the FMC based on the session identifier for the second EFB, wherein the session between the second EFB and the FMC is established over the connection between the second EFB and the AID in accordance with the connection identifier for the second EFB.

The onboard system of any preceding clause, wherein the AID comprises a first EFB port and a second EFB port, wherein the instructions to establish the connection between the first EFB and the AID comprise instructions that cause the onboard system to: perform a first-EFB connection attempt to establish a connection between the first EFB and the first EFB port of the AID; make a first-EFB connection determination that the first-EFB connection attempt was successful; and in response to making the first-EFB connection determination, set the connection identifier for the first EFB to an identifier associated with the first EFB port.

The onboard system of any preceding clause, wherein the instructions to establish the connection between the second EFB and the AID comprise instructions that cause the onboard system to: perform an initial second-EFB connection attempt to establish a connection between the second EFB and the first EFB port of the AID; make an initial second-EFB connection determination that the initial second-EFB connection attempt was unsuccessful; in response to making the initial second-EFB connection determination, perform a subsequent second-EFB connection attempt to establish a connection between the second EFB and the second EFB port of the AID; make a subsequent second-EFB connection determination that the subsequent second-EFB connection attempt was successful; and in response to making the subsequent second-EFB connection determination, set the connection identifier for the second EFB to an identifier associated with the second EFB port.

The onboard system of any preceding clause, wherein the instructions to establish the connection between the first EFB and the AID comprise instructions that cause the onboard system to: obtain an initial FMC status message comprising first session information for the FMC; based on the first session information, make a first session determination that no EFB has an established session with the FMC; and in response to making the first session determination, set the connection identifier for the first EFB to an initial identifier in a pool of identifiers.

The onboard system of any preceding clause, wherein the instructions to establish the connection between the second EFB and the AID comprise instructions that cause the onboard system to: obtain a subsequent FMC status message comprising second session information for the FMC; based on the second session information, make a second session determination that the first EFB has an established session with the FMC; and in response to making the second session determination, set the connection identifier for the second EFB to a next identifier in the pool of identifiers, the next identifier comprising a next identifier with respect to the initial identifier.

The onboard system of any preceding clause, wherein the instructions to set the session identifier for the first EFB comprise instructions that cause the onboard system to: set the FMC to a first waiting mode associated with a first session identifier; receive the session request by the first EFB while the FMC is set to the first waiting mode associated with the first session identifier; and in response to receiving the session request by the first EFB, set the session identifier for the first EFB to the first session identifier.

The onboard system of any preceding clause, wherein the instructions to set the session identifier for the second EFB comprise instructions that cause the onboard system to: set the FMC to a second waiting mode associated with a second session identifier; receive the session request by the second EFB while the FMC is set to the second waiting mode associated with the second session identifier; and in response to receiving the session request by the second EFB, set the session identifier for the second EFB to the second session identifier.

A method carried out by an onboard system, the method comprising: establishing a connection between a first electronic flight bag (EFB) and an aircraft interface device (AID), the connection between the first EFB and the AID being associated with a connection identifier for the first EFB; making a first session determination that no EFB has an established session with the FMC; in response to making the first session determination, establishing a session between the first EFB and a flight management computer (FMC) based on a session identifier for the first EFB, wherein the session between the first EFB and the FMC is established over the connection between the first EFB and the AID in accordance with the connection identifier for the first EFB; establishing a connection between a second EFB and the AID, the connection between the second EFB and the AID being associated with a connection identifier for the second EFB; making a second session determination that the first EFB has an established session with the FMC; and in response to making the second session determination, establishing a session between the second EFB and the FMC based on a session identifier for the second EFB, wherein the session between the second EFB and the FMC is established over the connection between the second EFB and the AID in accordance with the connection identifier for the second EFB.

The method of any preceding clause, wherein the AID comprises a first EFB port, wherein making the first session determination includes: performing a first-EFB connection attempt to establish a connection between the first EFB and the first EFB port of the AID; and making a first-EFB connection determination that the first-EFB connection attempt was successful, and wherein the connection identifier for the first EFB comprises an identifier associated with the first EFB port.

The method of any preceding clause, wherein the AID further comprises a second EFB port, wherein making the second session determination includes: performing an initial second-EFB connection attempt to establish a connection between the second EFB and the first EFB port of the AID; making an initial second-EFB connection determination that the initial second-EFB connection attempt was unsuccessful; in response to making the initial second-EFB connection determination, performing a subsequent second-EFB connection attempt to establish a connection between the second EFB and the second EFB port of the AID; and making a subsequent second-EFB connection determination that the subsequent second-EFB connection attempt was successful, and wherein the connection identifier for the second EFB comprises an identifier associated with the second EFB port.

The method of any preceding clause, wherein making the first session determination includes: obtaining an initial FMC status message comprising first session information for the FMC; and based on the first session information, making a first session determination that no EFB has an established session with the FMC, and wherein the connection identifier for the first EFB comprises an initial identifier in a pool of identifiers.

The method of any preceding clause, wherein making the second session determination includes: obtaining a subsequent FMC status message comprising second session information for the FMC; and based on the second session information, making a second session determination that the first EFB has an established session with the FMC, and wherein the connection identifier for the first EFB comprises a next identifier in a pool of identifiers, the next identifier comprising a next identifier with respect to the initial identifier.

The method of any preceding clause, wherein the session identifier for the first EFB is associated with a first multi-function control and display unit (MCDU), and wherein the session identifier for the second EFB is associated with a second MCDU different from the first MCDU.

What is claimed is:

1. A method carried out by an onboard system, the method comprising:
    establishing a connection between a first electronic flight bag (EFB) and an aircraft interface device (AID), the connection between the first EFB and the AID being associated with a connection identifier for the first EFB;
    setting a session identifier for the first EFB in response to a session request by the first EFB over the connection between the first EFB and the AID;
    establishing a session between the first EFB and a flight management computer (FMC) based on the session identifier for the first EFB, wherein the session between the first EFB and the FMC is established over the connection between the first EFB and the AID in accordance with the connection identifier for the first EFB;
    establishing a connection between a second EFB and the AID, the connection between the second EFB and the AID being associated with a connection identifier for the second EFB;
    setting a session identifier for the second EFB in response to a session request by the second EFB over the connection between the second EFB and the AID; and
    establishing a session between the second EFB and the FMC based on the session identifier for the second EFB, wherein the session between the second EFB and the FMC is established over the connection between the second EFB and the AID in accordance with the connection identifier for the second EFB.

2. The method of claim 1, wherein the AID comprises a first EFB port, wherein establishing the connection between the first EFB and the AID comprises:
    performing a first-EFB connection attempt to establish a connection between the first EFB and the first EFB port of the AID;
    making a first-EFB connection determination that the first-EFB connection attempt was successful; and
    in response to making the first-EFB connection determination, setting the connection identifier for the first EFB to an identifier associated with the first EFB port.

3. The method of claim 2, wherein the AID further comprises a second EFB port, wherein establishing the connection between the second EFB and the AID comprises:
    performing an initial second-EFB connection attempt to establish a connection between the second EFB and the first EFB port of the AID;
    making an initial second-EFB connection determination that the initial second-EFB connection attempt was unsuccessful;
    in response to making the initial second-EFB connection determination, performing a subsequent second-EFB connection attempt to establish a connection between the second EFB and the second EFB port of the AID;
    making a subsequent second-EFB connection determination that the subsequent second-EFB connection attempt was successful; and
    in response to making the subsequent second-EFB connection determination, setting the connection identifier for the second EFB to an identifier associated with the second EFB port.

4. The method of claim 1, wherein establishing the connection between the first EFB and the AID comprises:
    obtaining an initial FMC status message comprising first session information for the FMC;
    based on the first session information, making a first session determination that no EFB has an established session with the FMC; and
    in response to making the first session determination, setting the connection identifier for the first EFB to an initial identifier in a pool of identifiers.

5. The method of claim 4, wherein establishing the connection between the second EFB and the AID comprises:
    obtaining a subsequent FMC status message comprising second session information for the FMC;
    based on the second session information, making a second session determination that the first EFB has an established session with the FMC; and
    in response to making the second session determination, setting the connection identifier for the second EFB to a next identifier in the pool of identifiers, the next identifier comprising a next identifier with respect to the initial identifier.

6. The method of claim 1, wherein setting the session identifier for the first EFB comprises:
    setting the FMC to a first waiting mode associated with a first session identifier;
    receiving the session request by the first EFB while the FMC is set to the first waiting mode associated with the first session identifier; and
    in response to receiving the session request by the first EFB, setting the session identifier for the first EFB to the first session identifier.

7. The method of claim 6, wherein setting the session identifier for the second EFB comprises:
    setting the FMC to a second waiting mode associated with a second session identifier;
    receiving the session request by the second EFB while the FMC is set to the second waiting mode associated with the second session identifier; and
    in response to receiving the session request by the second EFB, setting the session identifier for the second EFB to the second session identifier.

8. An onboard system comprising a flight management computer (FMC), an aircraft interface device (AID), a first electronic flight bag (EFB), a second EFB, a processor, and a non-transitory computer-readable storage medium comprising instructions that, when executed by the processor, cause the onboard system to:
    establish a connection between the first EFB and the AID, the connection between the first EFB and the AID being associated with a connection identifier for the first EFB;
    set a session identifier for the first EFB in response to a session request by the first EFB over the connection between the first EFB and the AID;
    establish a session between the first EFB and the FMC based on the session identifier for the first EFB, wherein the session between the first EFB and the FMC is established over the connection between the first EFB and the AID in accordance with the connection identifier for the first EFB;

establish a connection between a second EFB and the AID, the connection between the second EFB and the AID being associated with a connection identifier for the second EFB;
set a session identifier for the second EFB in response to a session request by the second EFB over the connection between the second EFB and the AID; and
establish a session between the second EFB and the FMC based on the session identifier for the second EFB, wherein the session between the second EFB and the FMC is established over the connection between the second EFB and the AID in accordance with the connection identifier for the second EFB.

9. The onboard system of claim 8, wherein the AID comprises a first EFB port and a second EFB port, wherein the instructions to establish the connection between the first EFB and the AID comprise instructions that cause the onboard system to:
perform a first-EFB connection attempt to establish a connection between the first EFB and the first EFB port of the AID;
make a first-EFB connection determination that the first-EFB connection attempt was successful; and
in response to making the first-EFB connection determination, set the connection identifier for the first EFB to an identifier associated with the first EFB port.

10. The onboard system of claim 9, wherein the instructions to establish the connection between the second EFB and the AID comprise instructions that cause the onboard system to:
perform an initial second-EFB connection attempt to establish a connection between the second EFB and the first EFB port of the AID;
make an initial second-EFB connection determination that the initial second-EFB connection attempt was unsuccessful;
in response to making the initial second-EFB connection determination, perform a subsequent second-EFB connection attempt to establish a connection between the second EFB and the second EFB port of the AID;
make a subsequent second-EFB connection determination that the subsequent second-EFB connection attempt was successful; and
in response to making the subsequent second-EFB connection determination, set the connection identifier for the second EFB to an identifier associated with the second EFB port.

11. The onboard system of claim 8, wherein the instructions to establish the connection between the first EFB and the AID comprise instructions that cause the onboard system to:
obtain an initial FMC status message comprising first session information for the FMC;
based on the first session information, make a first session determination that no EFB has an established session with the FMC; and
in response to making the first session determination, set the connection identifier for the first EFB to an initial identifier in a pool of identifiers.

12. The onboard system of claim 11, wherein the instructions to establish the connection between the second EFB and the AID comprise instructions that cause the onboard system to:
obtain a subsequent FMC status message comprising second session information for the FMC;
based on the second session information, make a second session determination that the first EFB has an established session with the FMC; and
in response to making the second session determination, set the connection identifier for the second EFB to a next identifier in the pool of identifiers, the next identifier comprising a next identifier with respect to the initial identifier.

13. The onboard system of claim 8, wherein the instructions to set the session identifier for the first EFB comprise instructions that cause the onboard system to:
set the FMC to a first waiting mode associated with a first session identifier;
receive the session request by the first EFB while the FMC is set to the first waiting mode associated with the first session identifier; and
in response to receiving the session request by the first EFB, set the session identifier for the first EFB to the first session identifier.

14. The onboard system of claim 13, wherein the instructions to set the session identifier for the second EFB comprise instructions that cause the onboard system to:
set the FMC to a second waiting mode associated with a second session identifier;
receive the session request by the second EFB while the FMC is set to the second waiting mode associated with the second session identifier; and
in response to receiving the session request by the second EFB, set the session identifier for the second EFB to the second session identifier.

15. A method carried out by an onboard system, the method comprising:
establishing a connection between a first electronic flight bag (EFB) and an aircraft interface device (AID), the connection between the first EFB and the AID being associated with a connection identifier for the first EFB;
making a first session determination that no EFB has an established session with the FMC;
in response to making the first session determination, establishing a session between the first EFB and a flight management computer (FMC) based on a session identifier for the first EFB, wherein the session between the first EFB and the FMC is established over the connection between the first EFB and the AID in accordance with the connection identifier for the first EFB;
establishing a connection between a second EFB and the AID, the connection between the second EFB and the AID being associated with a connection identifier for the second EFB;
making a second session determination that the first EFB has an established session with the FMC; and
in response to making the second session determination, establishing a session between the second EFB and the FMC based on a session identifier for the second EFB, wherein the session between the second EFB and the FMC is established over the connection between the second EFB and the AID in accordance with the connection identifier for the second EFB.

16. The method of claim 15, wherein:
the AID comprises a first EFB port,
making the first session determination includes:
performing a first-EFB connection attempt to establish a connection between the first EFB and the first EFB port of the AID; and
making a first-EFB connection determination that the first-EFB connection attempt was successful, and the connection identifier for the first EFB comprises an identifier associated with the first EFB port.

17. The method of claim 16, wherein:

the AID further comprises a second EFB port, making the second session determination includes:
- performing an initial second-EFB connection attempt to establish a connection between the second EFB and the first EFB port of the AID;
- making an initial second-EFB connection determination that the initial second-EFB connection attempt was unsuccessful;
- in response to making the initial second-EFB connection determination, performing a subsequent second-EFB connection attempt to establish a connection between the second EFB and the second EFB port of the AID; and
- making a subsequent second-EFB connection determination that the subsequent second-EFB connection attempt was successful, and the connection identifier for the second EFB comprises an identifier associated with the second EFB port.

18. The method of claim 15, wherein:

making the first session determination includes:
- obtaining an initial FMC status message comprising first session information for the FMC; and
- based on the first session information, making a first session determination that no EFB has an established session with the FMC, and the connection identifier for the first EFB comprises an initial identifier in a pool of identifiers.

19. The method of claim 18, wherein:

making the second session determination includes:
- obtaining a subsequent FMC status message comprising second session information for the FMC; and
- based on the second session information, making a second session determination that the first EFB has an established session with the FMC, and the connection identifier for the first EFB comprises a next identifier in a pool of identifiers, the next identifier comprising a next identifier with respect to the initial identifier.

20. The method of claim 15, wherein:

the session identifier for the first EFB is associated with a first multi-function control and display unit (MCDU), and the session identifier for the second EFB is associated with a second MCDU different from the first MCDU.

* * * * *